US011042195B1

(12) United States Patent
Hong et al.

(10) Patent No.: US 11,042,195 B1
(45) Date of Patent: Jun. 22, 2021

(54) MOBILE TERMINAL

(71) Applicant: LG ELECTRONICS INC., Seoul (KR)

(72) Inventors: Sungchul Hong, Seoul (KR); Insu Song, Seoul (KR); Minsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/010,697

(22) Filed: Sep. 2, 2020

(30) Foreign Application Priority Data

Apr. 9, 2020 (WO) ................ PCT/KR2020/004795

(51) Int. Cl.
*G06F 1/16* (2006.01)
*B32B 27/08* (2006.01)

(52) U.S. Cl.
CPC ............ G06F 1/1652 (2013.01); B32B 27/08 (2013.01); G06F 1/1624 (2013.01); G06F 1/1681 (2013.01); *B32B 2367/00* (2013.01); *B32B 2375/00* (2013.01); *G06F 2200/1612* (2013.01)

(58) Field of Classification Search
CPC ..... G06F 1/1624; G06F 1/1652; G06F 1/1675
See application file for complete search history.

(56) References Cited

U.S. PATENT DOCUMENTS

| 2013/0058063 | A1* | 3/2013 | O'Brien | ................ G06F 1/1652 361/807 |
| 2013/0222293 | A1* | 8/2013 | Chung | .................. G06F 1/1652 345/173 |
| 2016/0316587 | A1 | 10/2016 | Lee et al. | |
| 2016/0363960 | A1 | 12/2016 | Park et al. | |
| 2017/0061932 | A1* | 3/2017 | Kwon | .................... G06F 3/0488 |
| 2017/0364119 | A1 | 12/2017 | Lee et al. | |
| 2018/0014417 | A1* | 1/2018 | Seo | ......................... H05K 1/189 |
| 2018/0102072 | A1* | 4/2018 | Lee | ......................... G06F 3/147 |

(Continued)

FOREIGN PATENT DOCUMENTS

KR  1020080057479  6/2008
KR  1020160141255  12/2016
(Continued)

OTHER PUBLICATIONS

European Patent Office Application Serial No. 20196431.9, Search Report dated Mar. 10, 2021, 8 pages.

(Continued)

*Primary Examiner* — Anthony Q Edwards
(74) *Attorney, Agent, or Firm* — Lee, Hong, Degerman, Kang & Waimey

(57) ABSTRACT

A mobile terminal able to be switched from a first state to a second state by expanding in a first direction includes a first frame, a second frame movable in a sliding manner from the first frame, a slide frame movable in the first direction or in the second direction with respect to the second frame, a roller coupled to one side of the second frame in a manner of being rotatable in a third direction perpendicular to the first direction, a flexible display unit including a third region bent while surrounding the second frame, and a rolling plate having one surface, wherein the flexible display unit is attached to said one surface of the rolling plate, wherein the roller contains a high friction material.

16 Claims, 25 Drawing Sheets

(56) References Cited

U.S. PATENT DOCUMENTS

| | | | | |
|---|---|---|---|---|
| 2018/0103550 | A1* | 4/2018 | Seo | H04N 5/64 |
| 2018/0103552 | A1* | 4/2018 | Seo | G06F 1/1624 |
| 2019/0317550 | A1* | 10/2019 | Kim | G06F 1/1677 |
| 2020/0264660 | A1* | 8/2020 | Song | G06F 1/1686 |
| 2020/0348727 | A1* | 11/2020 | Lee | G06F 1/1652 |

FOREIGN PATENT DOCUMENTS

| | | |
|---|---|---|
| KR | 1020160148141 | 12/2016 |
| KR | 1020180039799 | 4/2018 |
| KR | 1020190101605 | 2/2019 |
| TW | M589939 | 1/2020 |

OTHER PUBLICATIONS

PCT International Application No. PCT/KR2020/004795, International Search Report dated Jan. 8, 2021, 10 pages.

* cited by examiner

FIG. 6
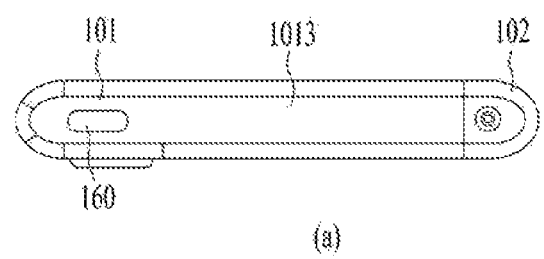
(a)
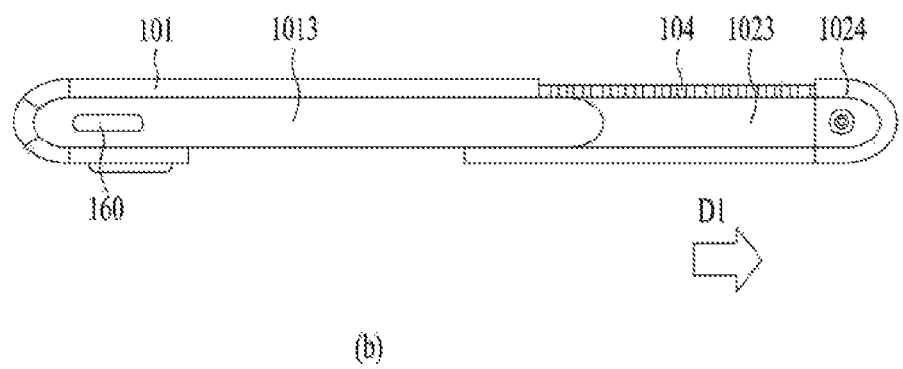
(b)

FIG. 7
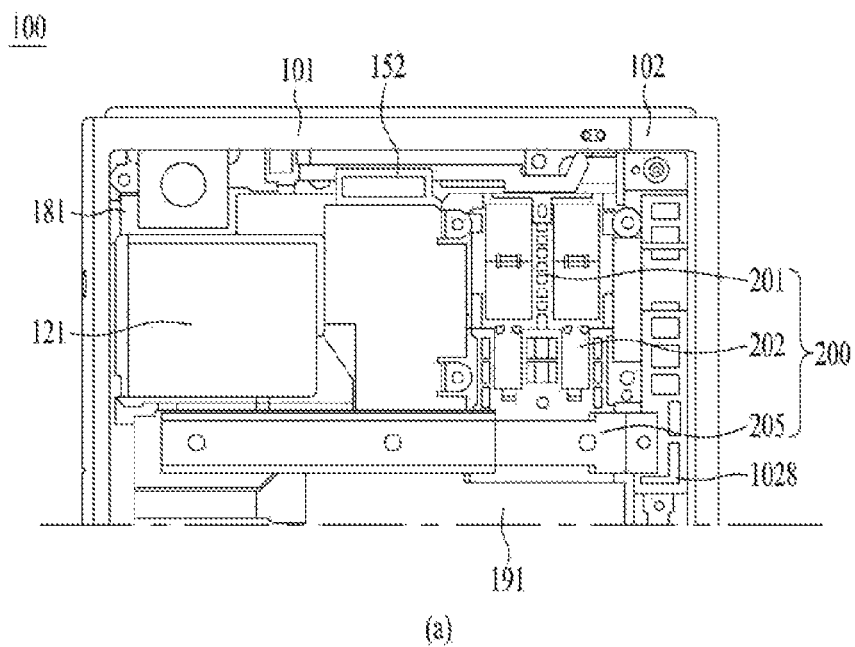
(a)
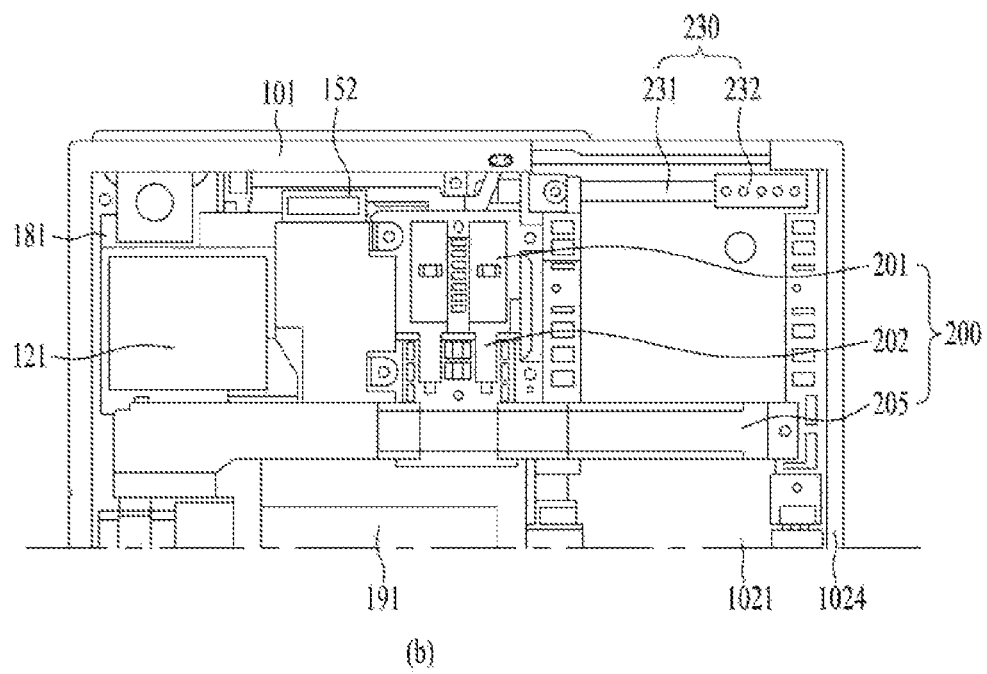
(b)

FIG. 8
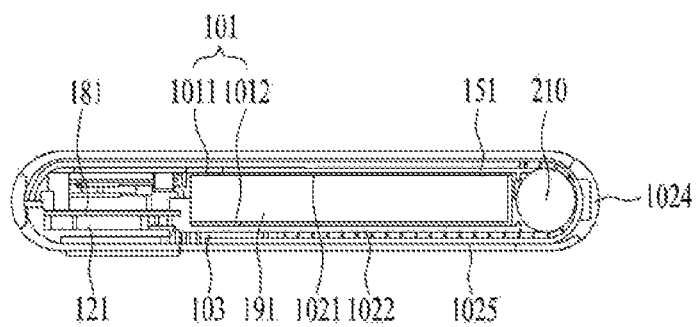
(a)
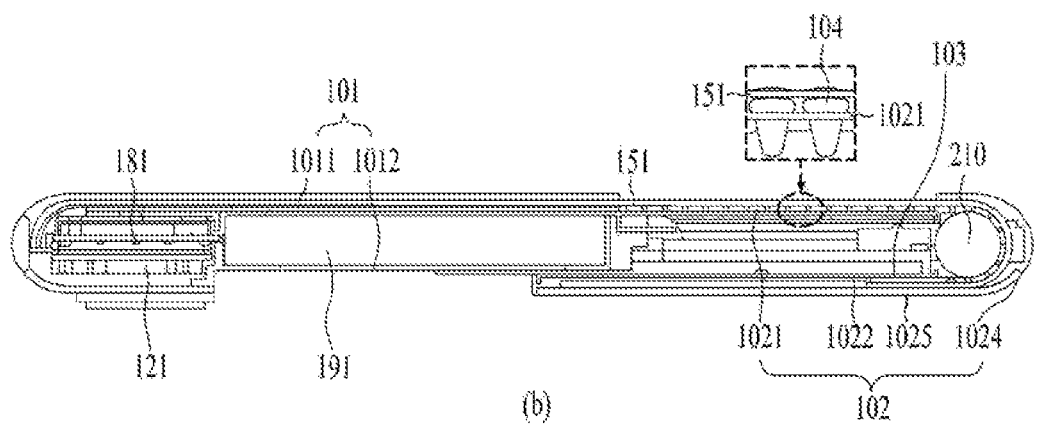
(b)

FIG. 10
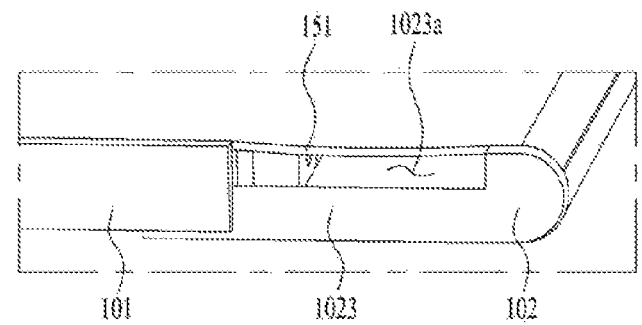
(a)
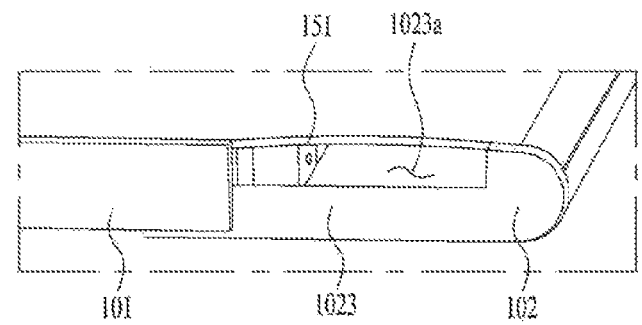
(b)

FIG. 12
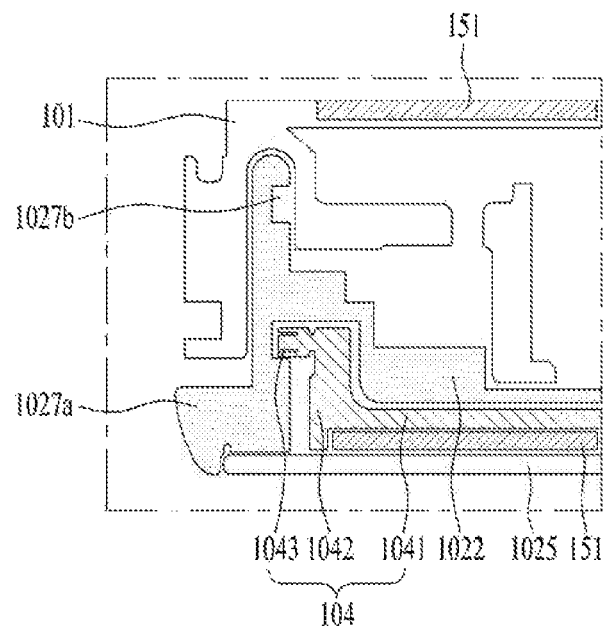
(a)
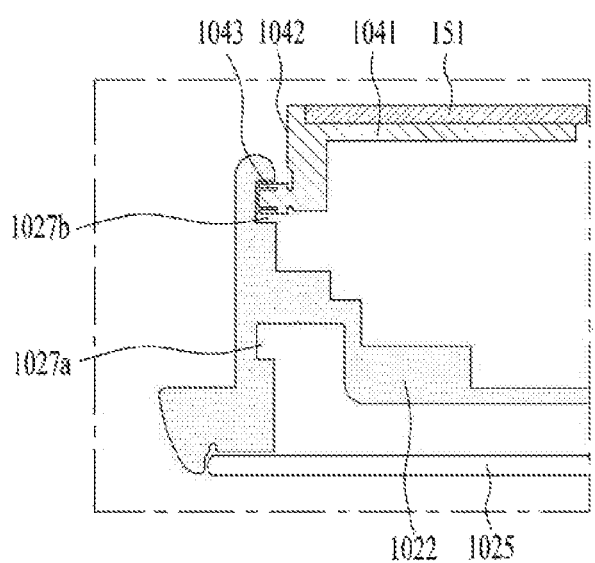
(b)

FIG. 13
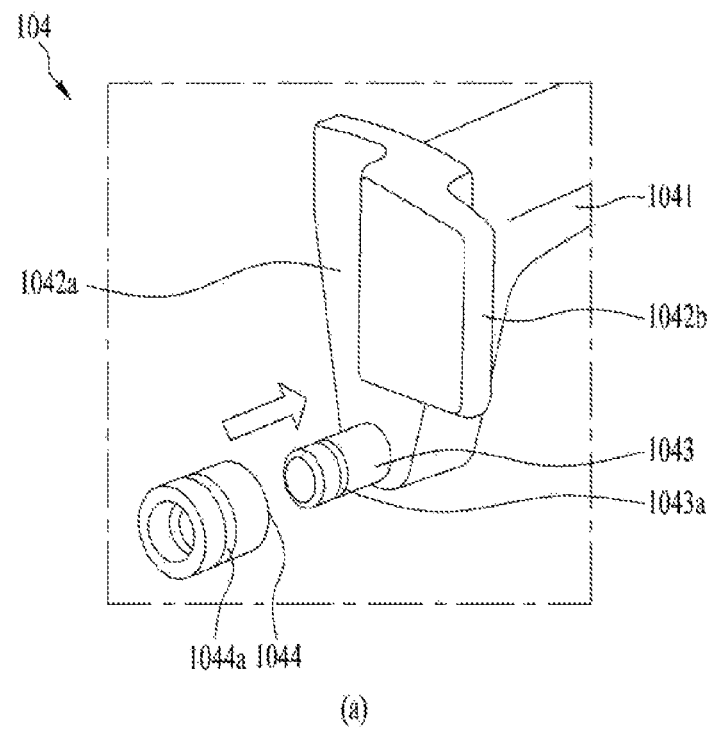
(a)
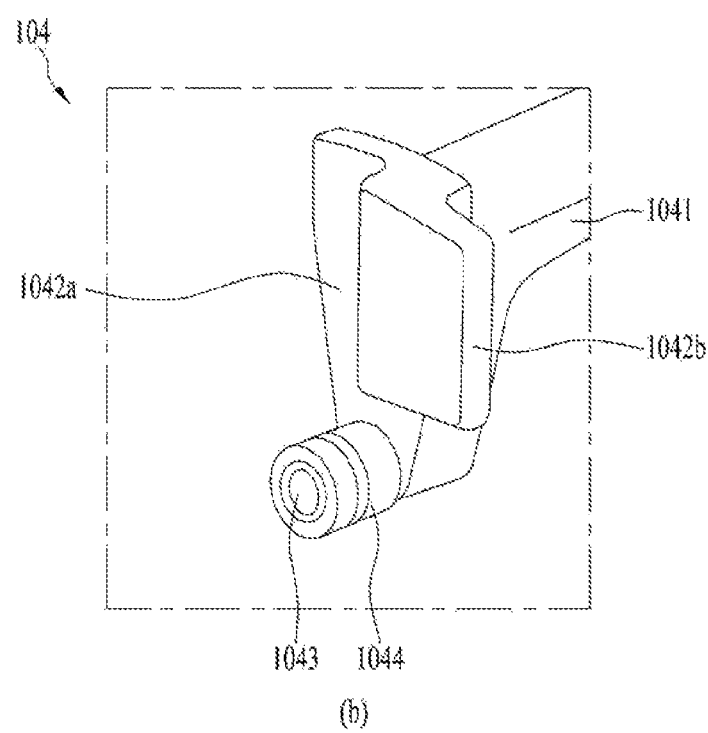
(b)

FIG. 14
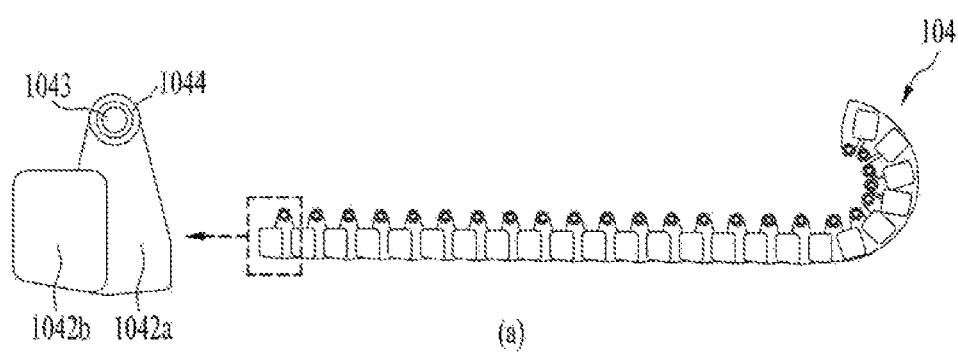
(a)
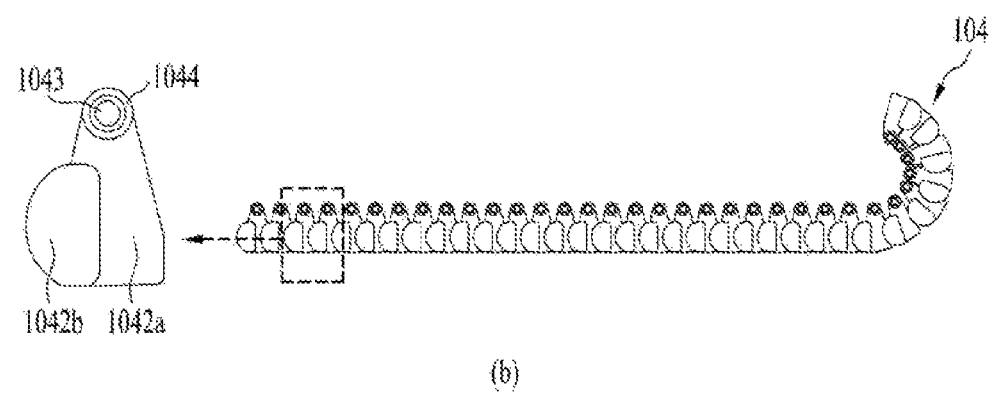
(b)

FIG. 16
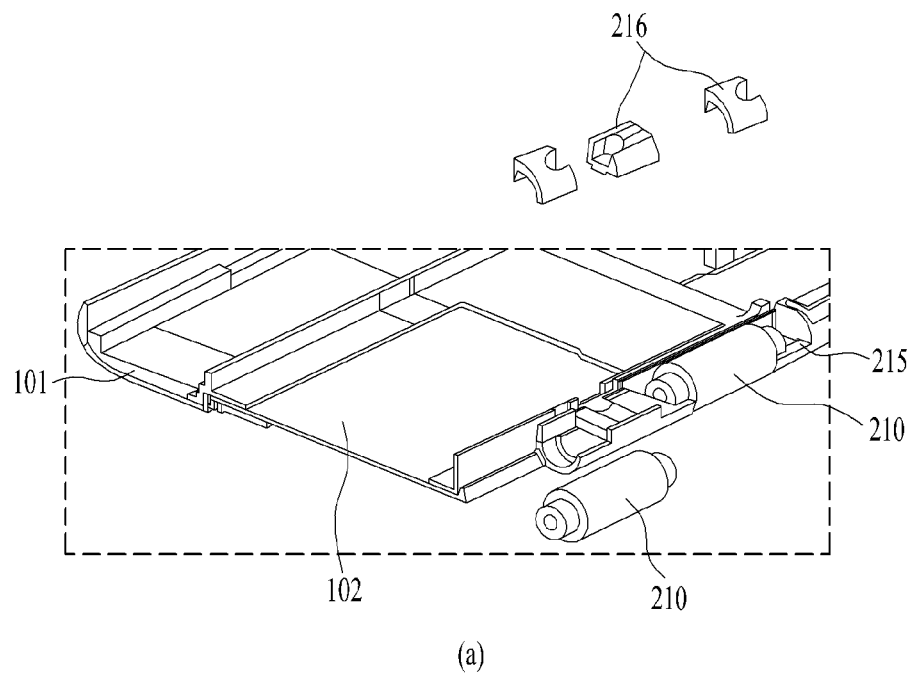
(a)
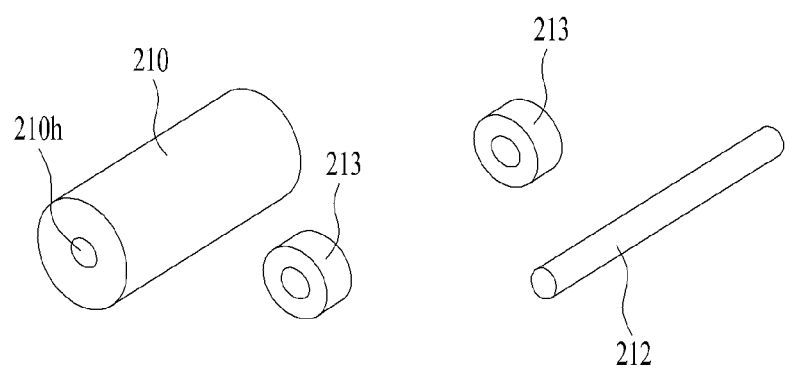
(b)

FIG. 18
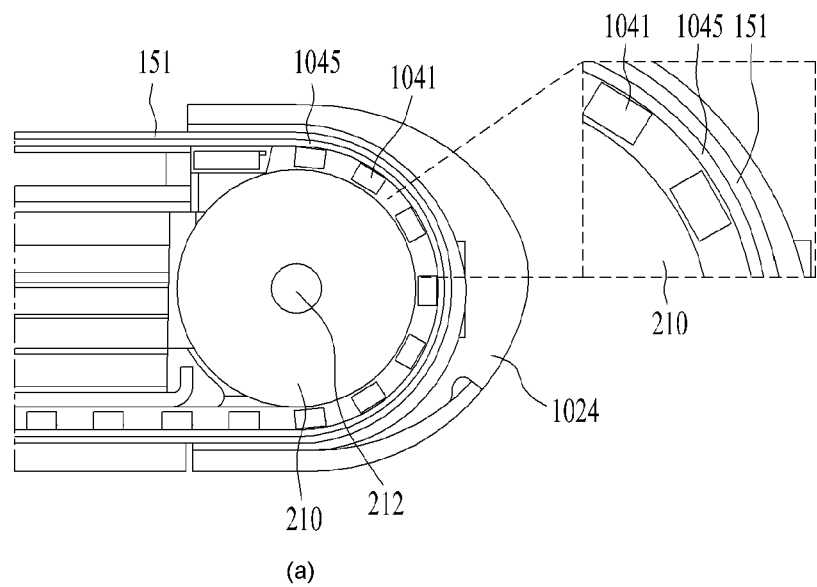
(a)
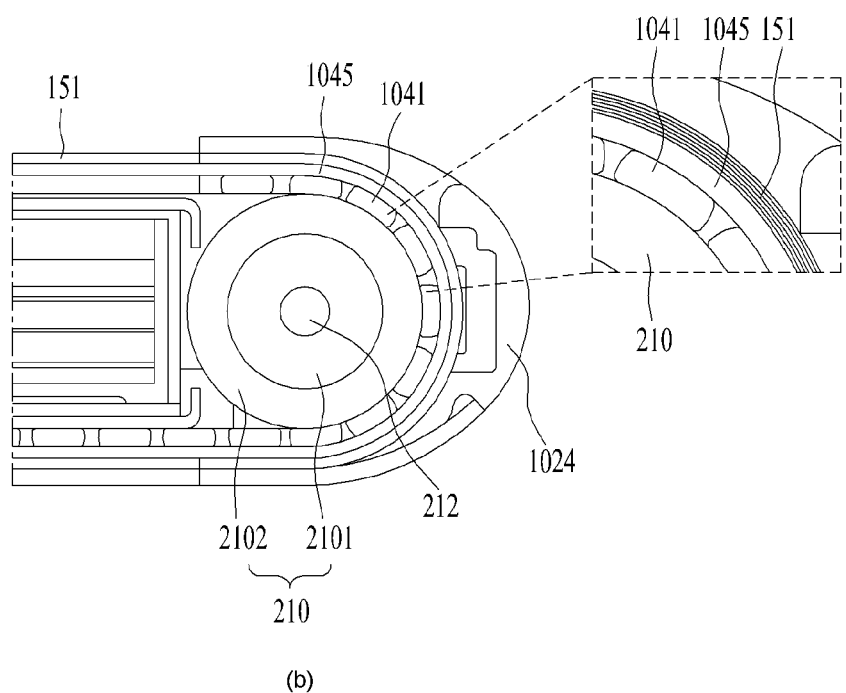
(b)

FIG. 19
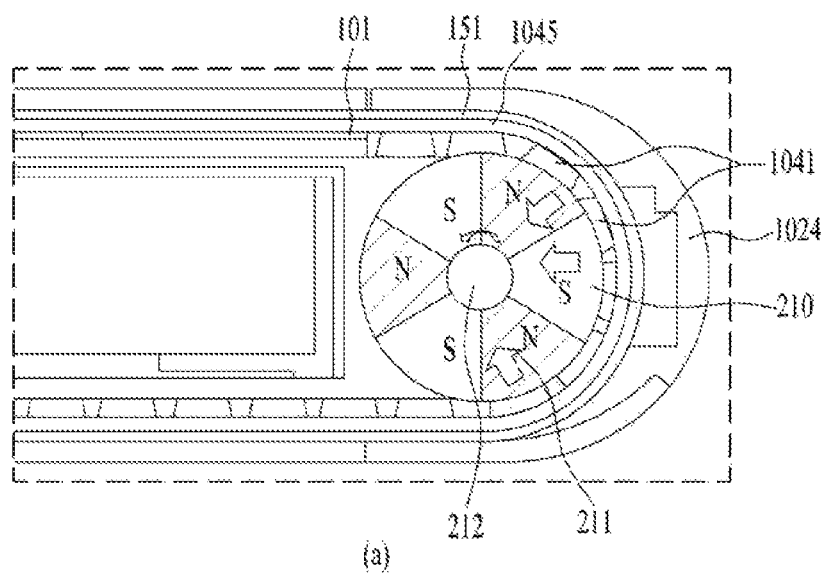
(a)
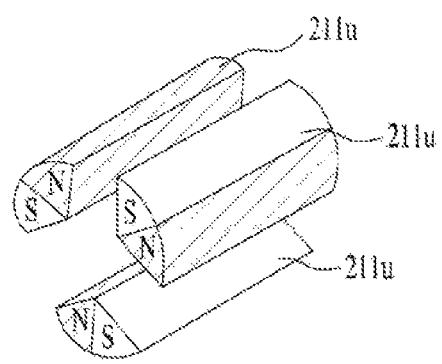
(b)

FIG. 20
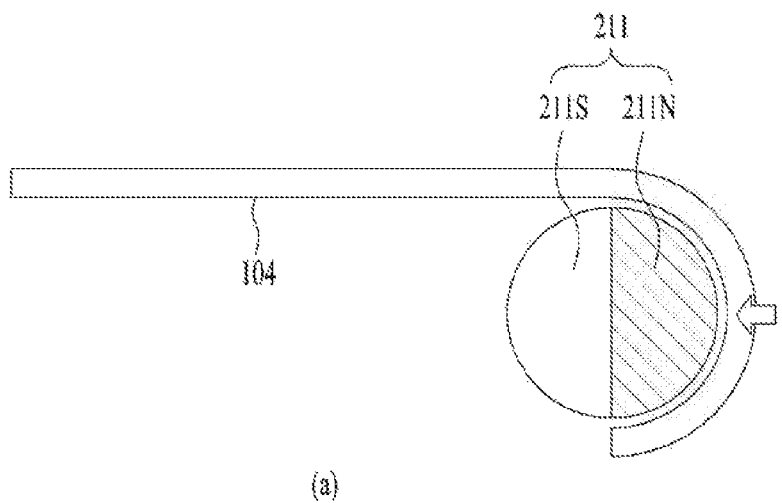
(a)
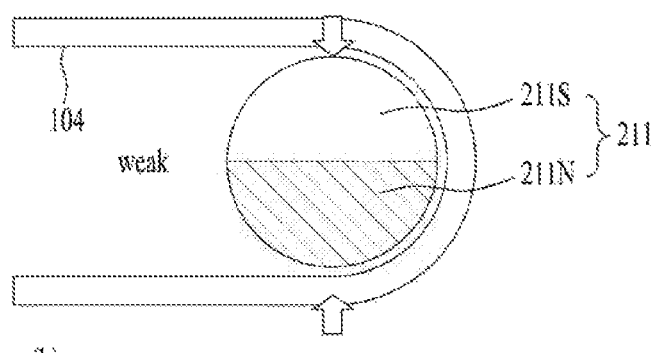
(b)
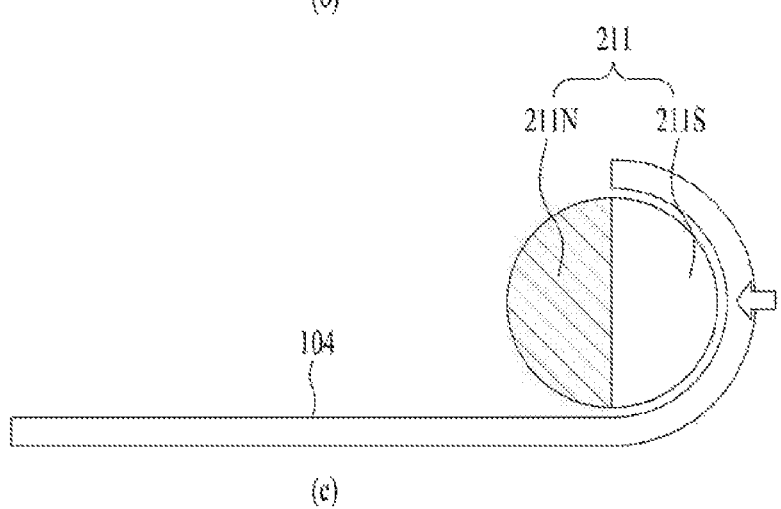
(c)

FIG. 21
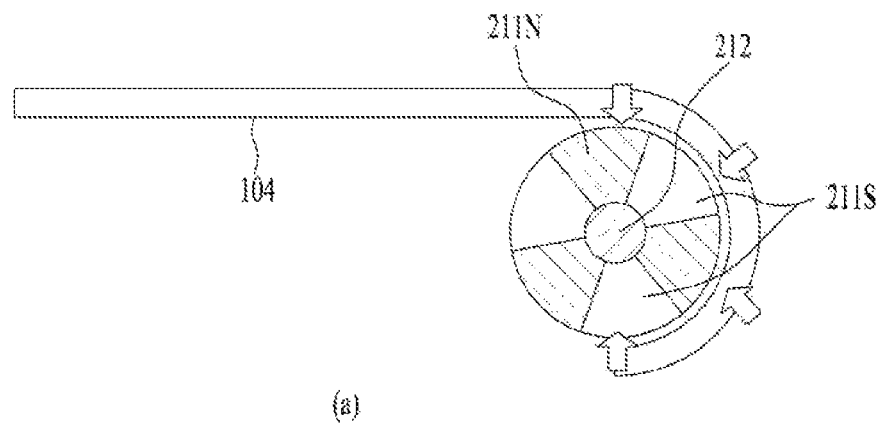
(a)
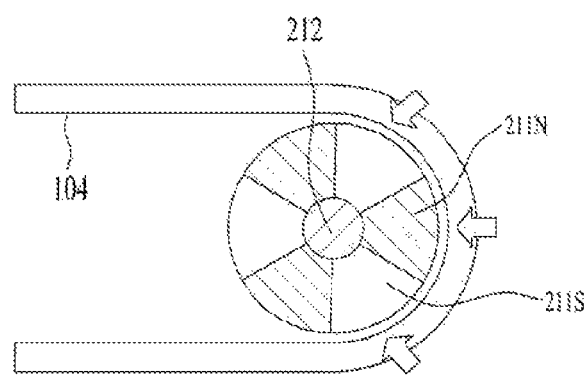
(b)
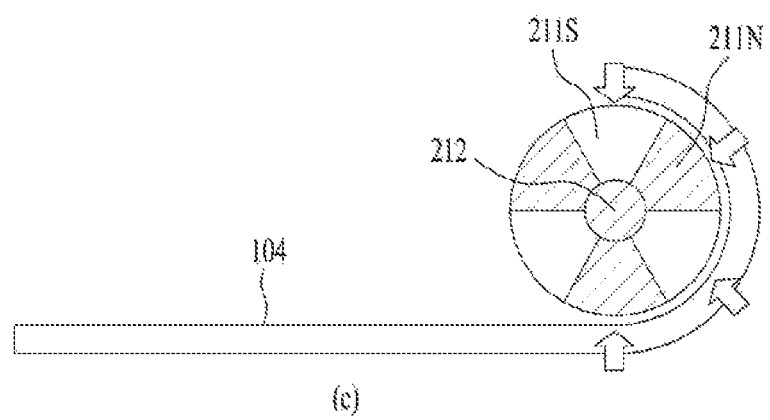
(c)

FIG. 22
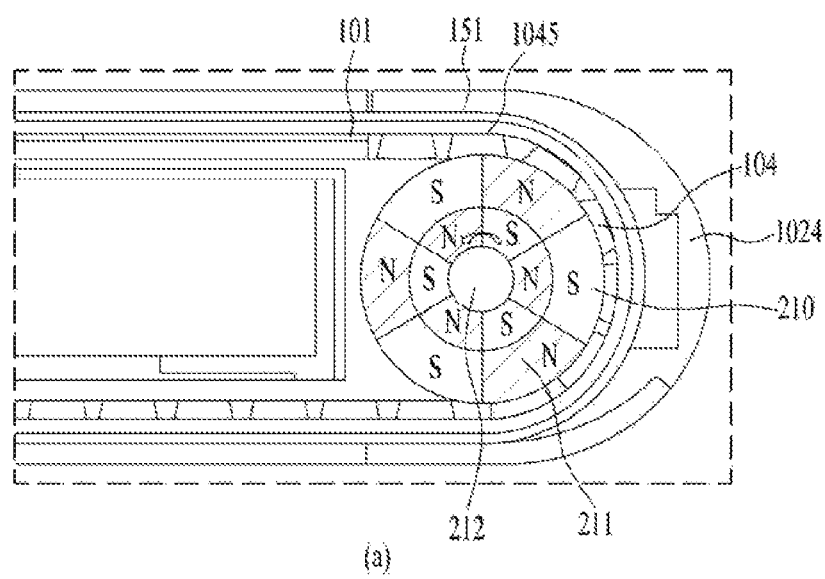
(a)
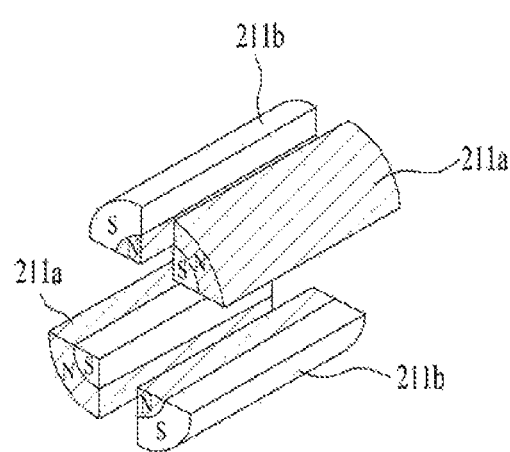
(b)

FIG. 23
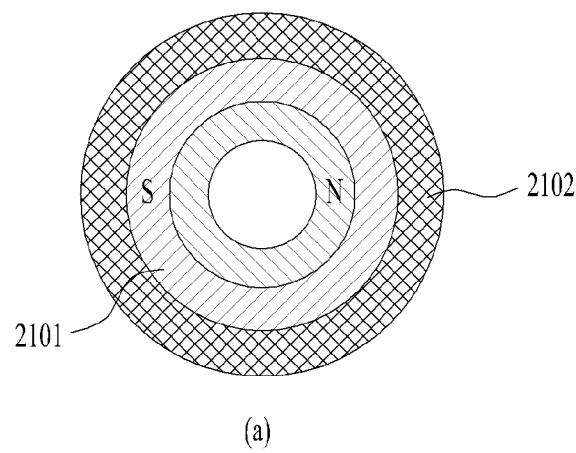
(a)
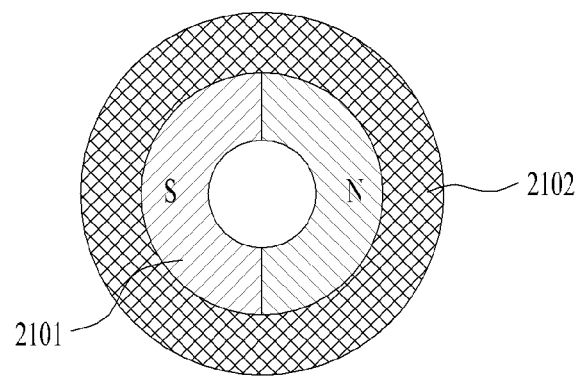
(b)
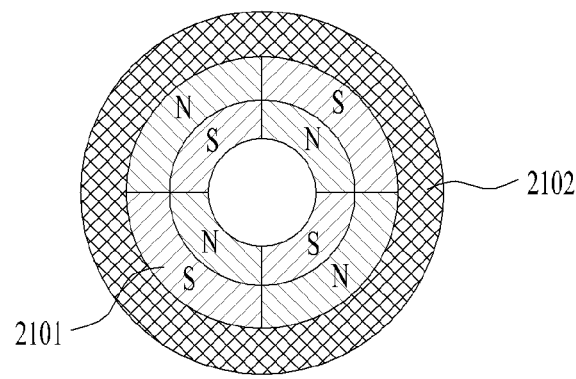
(c)

FIG. 24
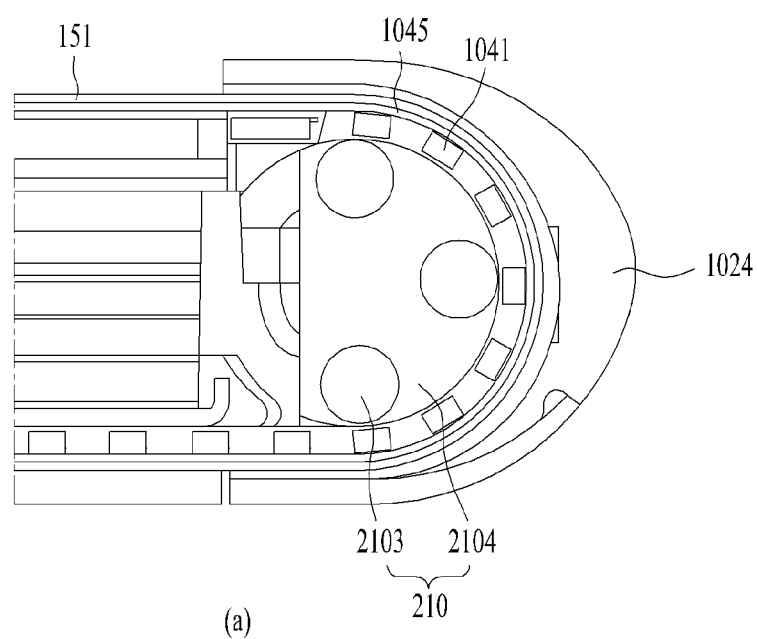
(a)
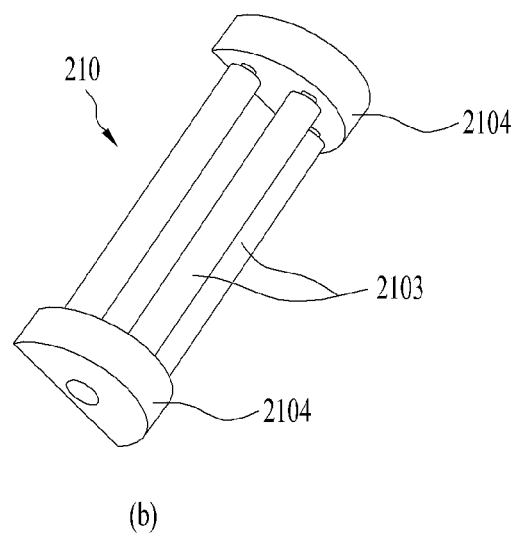
(b)

(a)      (b)

MOBILE TERMINAL

CROSS-REFERENCE TO RELATED APPLICATION(S)

Pursuant to 35 U.S.C. § 119 (a), this application claims the benefit of an earlier filing date and right of priority to International Application No. PCT/KR2020/004795 filed on Apr. 9, 2020, the contents of which are hereby incorporated by reference herein in its entirety.

BACKGROUND

Field

The present disclosure relates to a mobile terminal, and more particularly, to a mobile terminal that has a flexible display and is capable of extending a size of a screen while the display is scrolled and slid at the same time.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with a ubiquitous computing environment. In other words, the display device has evolved into a smart device that enables connectivity to a network and continuous computing.

Recently, a flexible display having sufficient elasticity and capable of large deformation has been developed. The size of a mobile terminal can be varied using the deformable nature of the flexible display. For the mobile terminal having such a variable structure, changing the size of the mobile terminal should be stably performed, and there is a need for a structure to support the extended display unit to maintain a flat state of the display unit.

SUMMARY

One purpose of the present disclosure is to provide a mobile terminal that may improve durability of a flexible display unit by not restricting a point where the flexible display unit is bent to a specific position.

Another purpose of the present disclosure is to provide a mobile terminal including a support structure of a flexible display unit that may stably support the flexible display unit when the flexible display unit is extended.

One aspect of the present disclosure proposes a mobile terminal able to be switched from a first state to a second state by expanding in a first direction including a first frame, a second frame movable in a sliding manner from the first frame in the first direction or in a second direction opposite to the first direction, a slide frame movable in the first direction or in the second direction with respect to the second frame, a roller coupled to one side of the second frame in a manner of being rotatable in a third direction perpendicular to the first direction, a flexible display unit including a first region coupled to the first frame, a second region coupled to the slide frame, and a third region positioned between the first region and the second region and bent while surrounding the second frame, and a rolling plate having one surface, wherein the flexible display unit is attached to said one surface of the rolling plate, wherein the roller contains a high friction material.

In one implementation, the roller may have a high surface roughness.

In one implementation, the roller may contain a thermoplastic polyurethane (TPU) or a thermoplastic polyester elastomer (TPEE).

In one implementation, the roller may include an inner high-strength plastic portion and a high-friction outer cover.

In one implementation, the rolling plate may contain a metal material, wherein the roller may include an inner magnetic roller and a high-friction outer cover.

In one implementation, the magnetic roller may be composed of circumferential series of magnetic portions having alternately arranged opposite polarities.

In one implementation, the magnetic roller may have a cylindrical shape combining a plurality of sintered magnets of a shape of a fan-shaped column with each other, wherein a portion in a direction of an outer surface and a portion in a rotation axis of the sintered magnet of the shape of the fan-shaped column may have opposite poles.

In one implementation, the roller may further include a roller shaft inserted into a shaft hole extending in the third direction, and each roller bearing fitted on the roller shaft and disposed on each of both sides of the roller shaft, wherein the second frame may include a seating portion, wherein the roller bearing is seated on the seating portion.

In one implementation, the roller may include each mini roller having a radius smaller than a radius of curvature of a curved face of the display unit bent while surrounding the roller.

In one implementation, each mini roller may include a plurality of mini rollers respectively arranged at a start point, an end point, and a middle portion of the curved face of the display unit.

In one implementation, at least one of the mini rollers may contain a high friction material, wherein at least one of the others of the mini rollers may contain a magnet.

In one implementation, the mobile terminal may further include a support link having one end hingeably coupled to the first frame and the other end hingeably coupled to the second frame, wherein a length of the support link varies, wherein the support link may be disposed to be adjacent to the roller in the first state.

In one implementation, the roller may include a plurality of rollers arranged in the third direction.

In one implementation, the rolling plate may include a plurality of support bars extending in the third direction perpendicular to the first direction and arranged side by side in the first direction, wherein the support bar may include a curved face having a curvature corresponding to a curvature of the roller.

In one implementation, the rolling plate may further include a magnetic force shielding sheet having one surface attached with the support bars and the other surface coupled to the flexible display unit.

The mobile terminal of the present disclosure may adjust a size of a screen as needed, so that both portability and usability may be satisfied.

In addition, a phenomenon in which the flexible display unit is lifted when the second frame moves may be prevented, thereby maintaining the display unit in a flat state.

In addition, when the flexible display unit expands or contracts, the flexible display unit may stably move.

In addition, space utilization may be increased by the mini roller and adhesion between the roller and the rolling plate may be easily adjusted.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a side view of the mobile terminal as viewed from a third direction;

FIG. 7 is a view showing a driving unit of the mobile terminal in accordance with an embodiment;

FIG. 8 is a cross-sectional view taken along lines A-A and B-B in FIG. 2;

FIG. 10 is a view illustrating an issue raised in an extendable mobile terminal;

FIG. 12 is a cross-sectional view taken along lines E-E and F-F in FIG. 11;

FIG. 13 is a view showing an expanded side portion and a guide hook of the mobile terminal in accordance with an embodiment;

FIG. 14 is a view showing a rolling plate of the mobile terminal in accordance with an embodiment;

FIGS. 16 and 17 are views showing a magnetic roller coupled to the second frame of the mobile terminal;

FIG. 18 is a view showing another embodiment of a roller of the present disclosure;

FIG. 19 is a cross-sectional view showing a magnetic roller and a rolling plate in accordance with an embodiment;

FIGS. 20 and 21 are views illustrating magnetic force applied to the rolling plate according to the number of poles of the magnetic roller;

FIG. 22 is a view showing a magnetic roller and a rolling plate in accordance with another embodiment;

FIG. 23 is a view showing another embodiment of a roller of a mobile terminal;

FIG. 24 is a view showing another embodiment of a roller of a mobile terminal.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
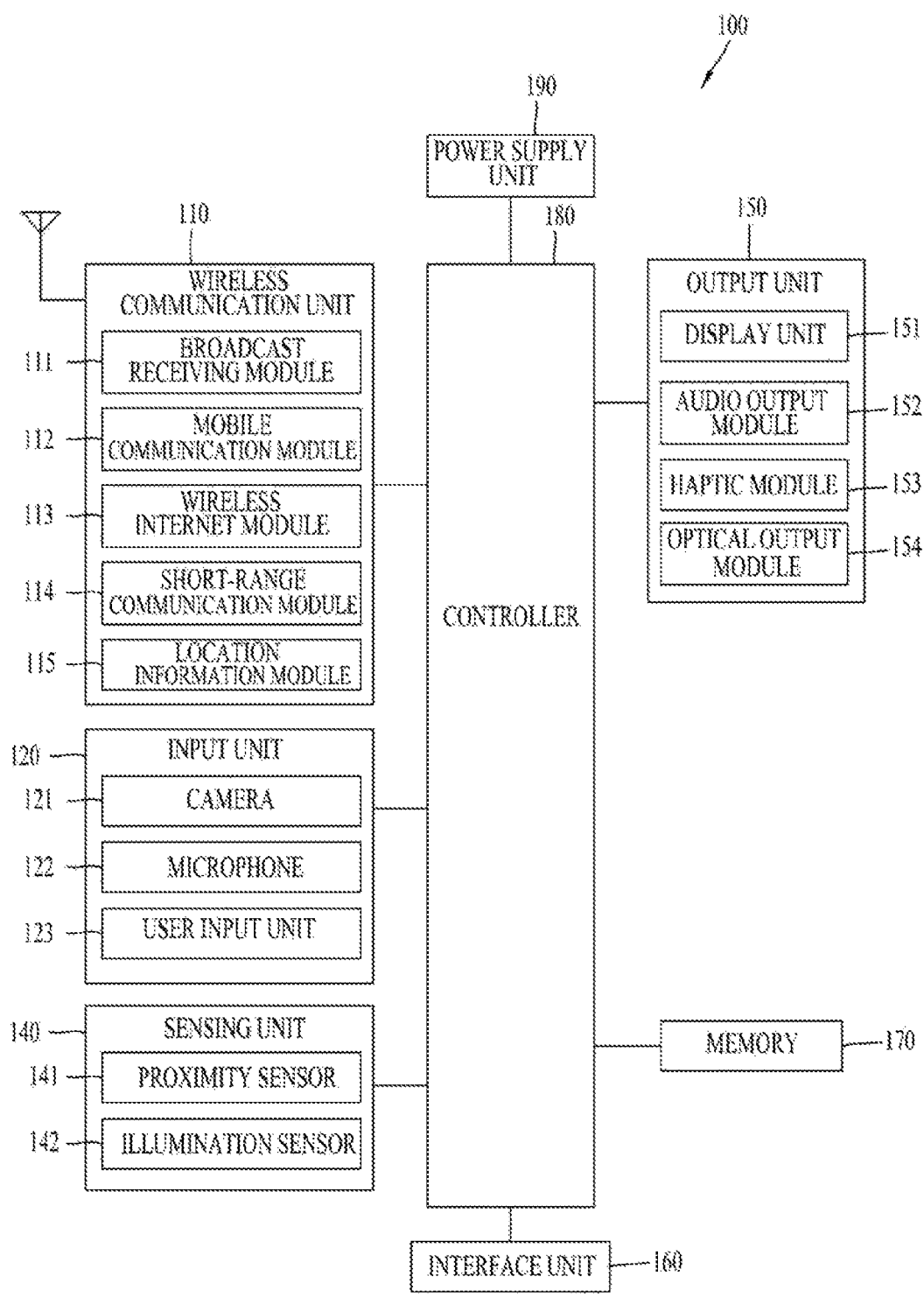
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
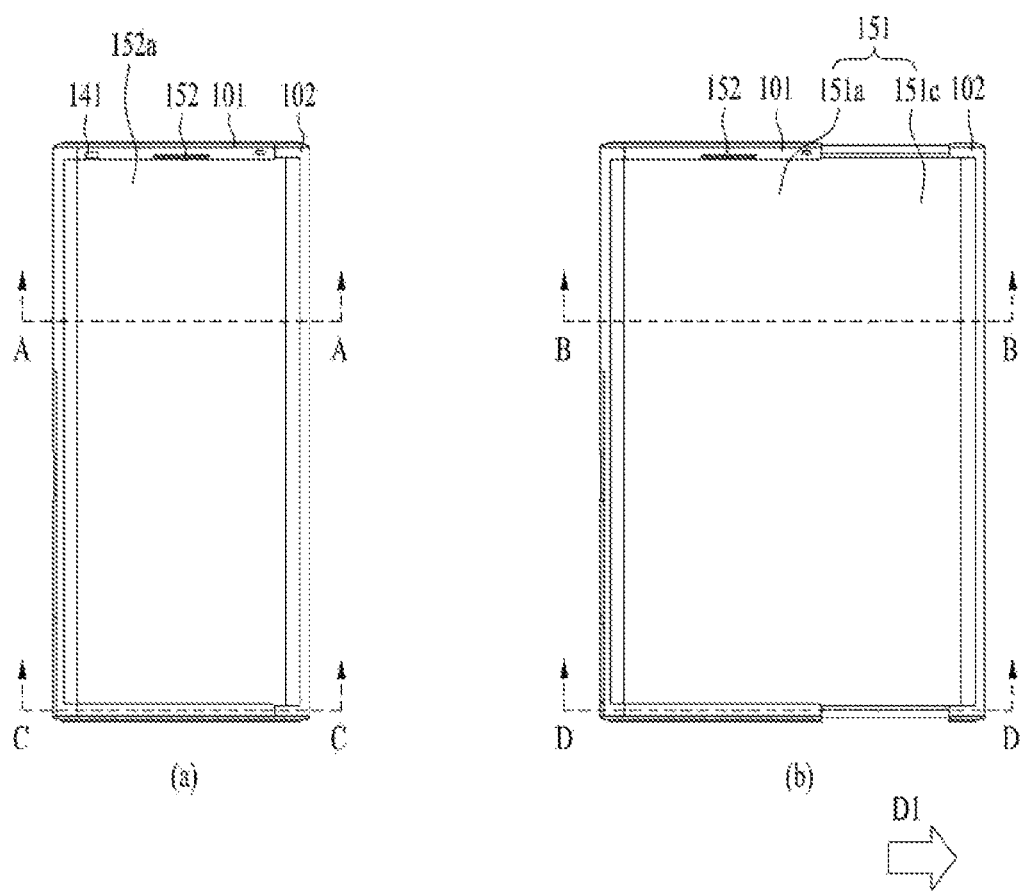
FIG. 2 is a front view of a first state and a second state of the mobile terminal in accordance with an embodiment.
Figure 3:
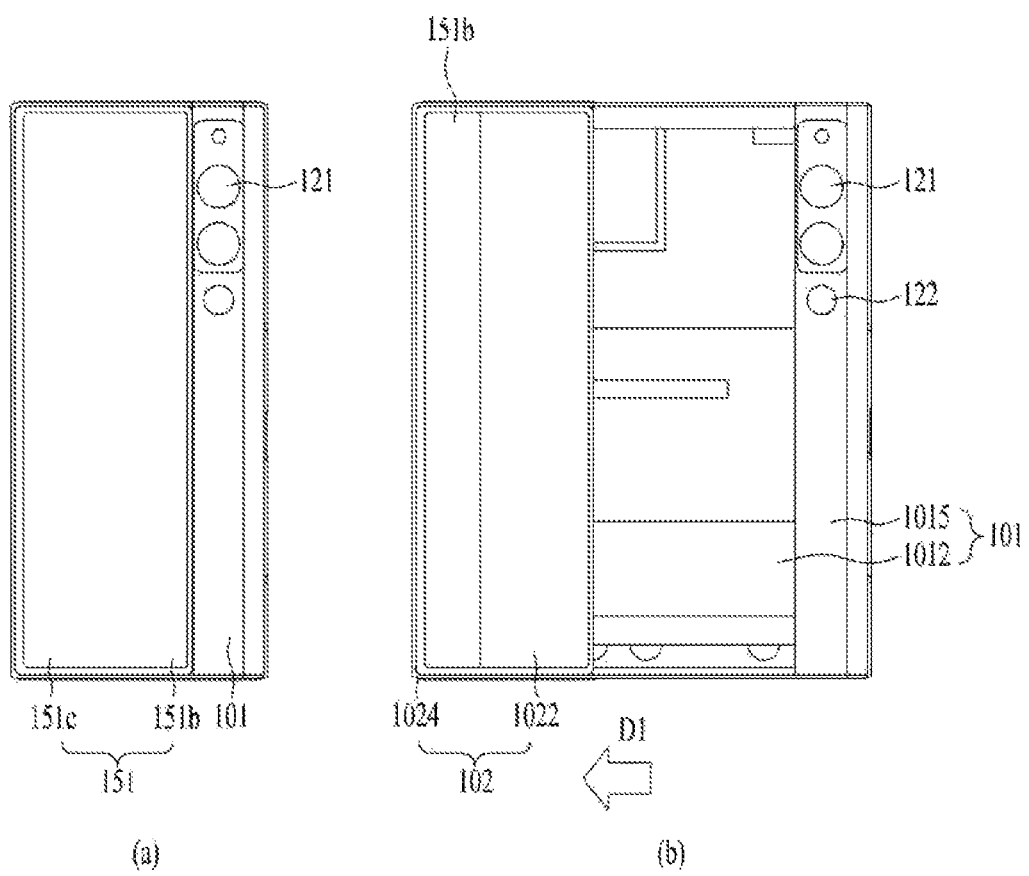
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 100 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of the rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
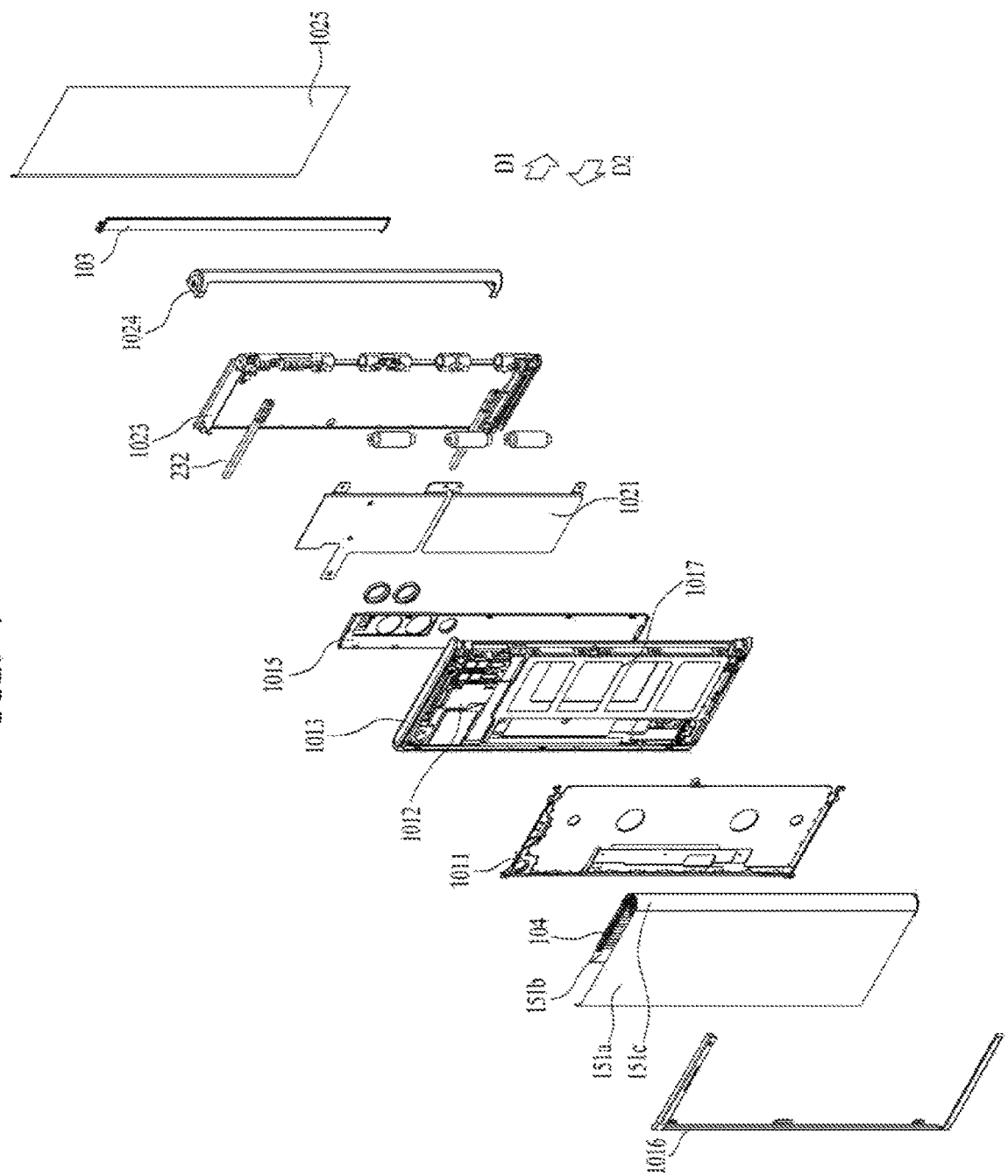
FIGS. 4 and 5 are exploded perspective views of the mobile terminal in accordance with an embodiment.
Figure 5:
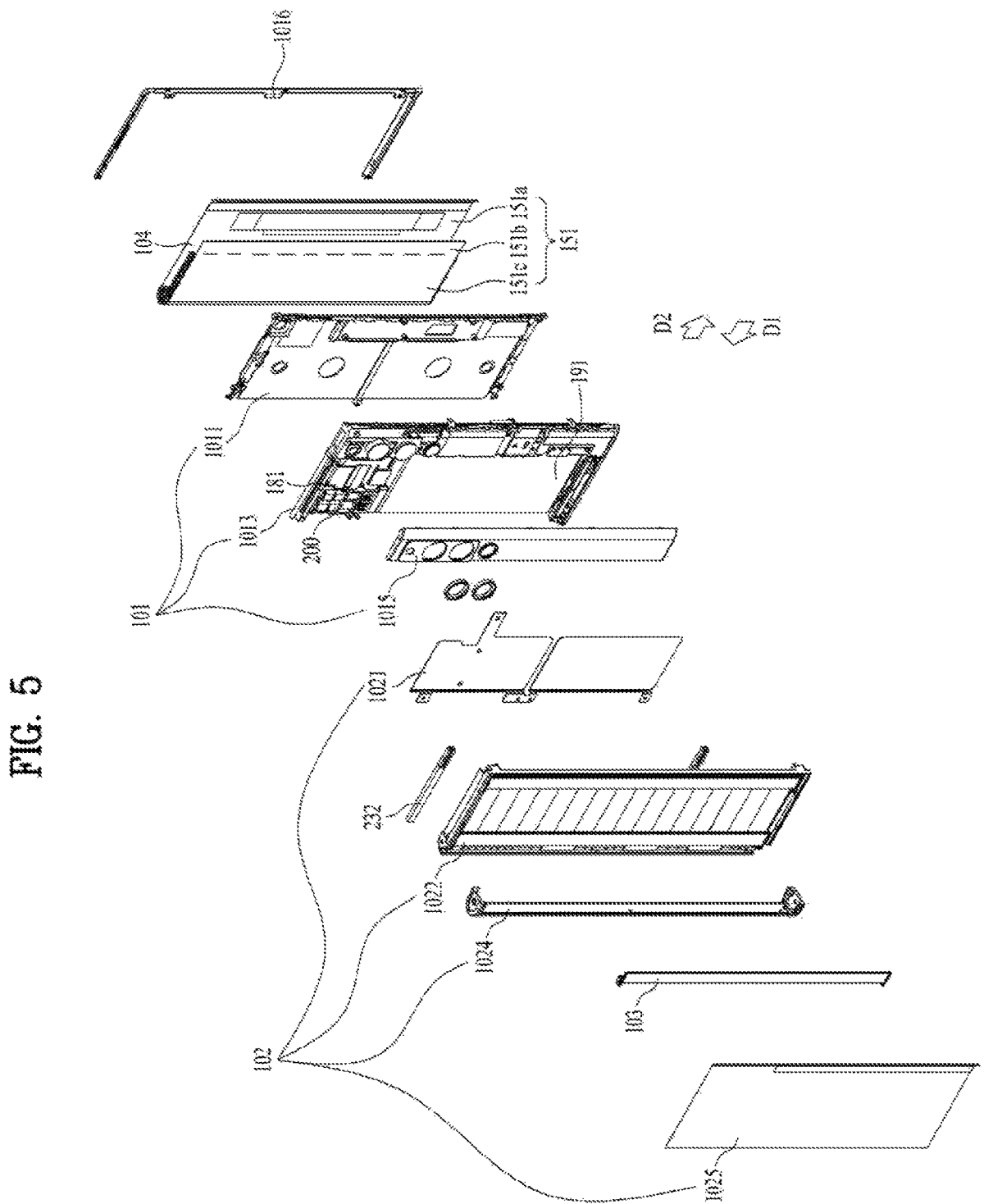

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted. A front deco 1016 may cover front edges of the first area 151a to protect the edges of the first area 151a.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151a and 151b and a variable portion 151c. The fixed portion 151a and 151b means a portion fixed to the frame. Because of being fixed to the frame, the fixed portion 151a and 151b maintains a constant shape without changing a bending degree. On the other hand, the variable portion 151c means a portion in which a bending angle or a position of the bent portion changes. The variable portion 151c in which the position or bending angle of the bent portion changes requires a structure for supporting a rear face of the variable portion 151c in response to the change.

The fixed portion 151a, 151b is coupled to the first frame of the display unit and is always positioned on the front face of the display unit to form a portion of the front face of the display unit. The variable portion 151c includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion 151c may be the front face and another portion of the variable portion 151c may be the rear face based on the first and second states. The variable portion 151c is positioned in the first direction with respect to the fixed portion 151a, 151b relative to the mobile terminal, and an end of the variable portion 151c is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(a), and may be exposed rearward in the second state as shown in FIG. 3(b).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to photograph himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna may be installed on the rear portion 1015. A rear portion 1015 may be used to protect the camera, the sensor, or the like on the exposed rear portion 1015 and not to deteriorate the exterior design. A portion of the rear portion 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

FIG. 6 is a side view of the mobile terminal as viewed from a third direction. FIG. 6 shows the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first rear frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151a disposed on the front of the mobile terminal 100, a second region 151b coupled to a slide frame 103 positioned on the rear of the mobile terminal 100, and a third region 151c located between the first region 151a and the second region 151b and bent around the roller 210. The third region 151c may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 151a may always be exposed to the front face of the mobile terminal 100.

The third region 151c may be adjacent to the first region 151a in the first direction and rolled on the roller 210. The third region 151c may partially cover the second frame 102, that is, the rear face of the second rear portion 1022. Further, the second frame 102, that is, the second rear portion 1022, is adjacent to the first frame 101, namely the first rear portion 1012 and together forms the rear case of the mobile terminal 100. Accordingly, it may be described that the third region 151c is also disposed on the rear face of the first frame 101.

The second region 151b may be adjacent to the third region 151c and may be disposed on the rear face of the mobile terminal 100, more specifically, on the second frame 102, that is, the rear face of the second rear portion 1022 thereof. The second region 151b may be coupled to the slide frame 103 without being directly coupled to the second frame 102.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

FIG. 7 is a view showing a driving unit 200 of the mobile terminal 100 in accordance with an embodiment. The mobile terminal 100 of the present disclosure may be switched between the states in a manner in which a user manually pulls the second frame 102 in the first direction or pushes the same in the second direction with respect to the first frame 101. However, in the manual method, applying excessive force to the body of the mobile terminal 100 may damage the mobile terminal 100. Accordingly, a driving unit 200 employing a motor 201 may be further provided to allow the second frame 102 to stably move without distortion.

As the motor 201, a motor 201 configured to provide rotational force as shown in FIG. 7, or a linear motor 201 configured to make linear motion may be used. The motor 201 configured to provide the rotational force may need to have a large diameter to provide large force. However, in order to provide driving force of a predetermined magnitude or more in the limited space of the mobile terminal 100 without increasing the thickness, two motors 201 may be used as shown in FIG. 7.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

FIG. 8 is a cross-sectional view taken along lines A-A and B-B in FIG. 2. As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(b), when switch to the second state occurs, the rolling plate 104 may move to the front and the rolling plate 104 may be positioned on the front portion of the second frame 102.

The third region 151c of the display unit 151 in which the rolling plate 104 is positioned is a portion where bending deformation occurs when switch from the first state to the second state occurs. Accordingly, the rolling plate 104 may be deformed according to deformation of the third region 151c. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Figure 9:
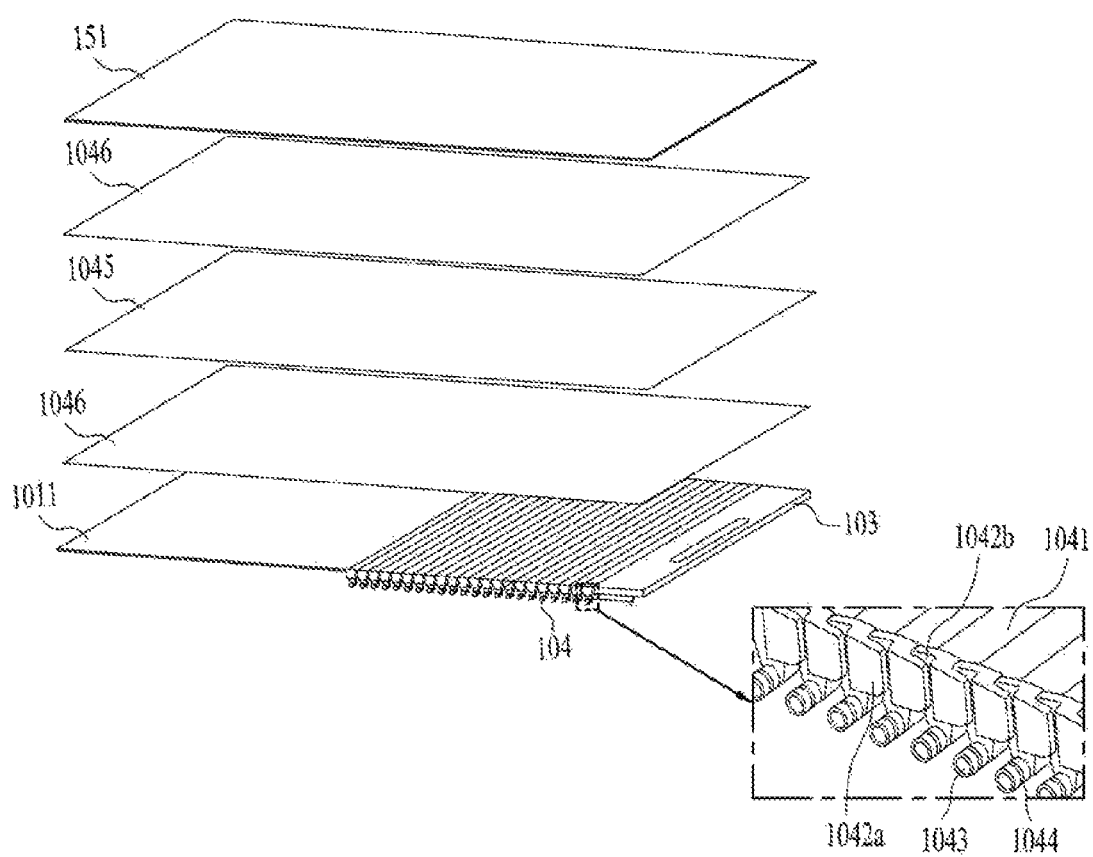
FIG. 9 is a view illustrating a display unit and a rolling plate of the mobile terminal in accordance with an embodiment.

FIG. 9 is a view illustrating a display unit 151 and a rolling plate 104 of the mobile terminal 100 in accordance with an embodiment. The rolling plate 104 may include multiple support bars 1041 extending in the third direction. The multiple support bars 1041 may be arranged side by side in the first direction and spaced apart from each other by a predetermined distance. Accordingly, even when the flexible display unit 151 is rolled around the roller 210 and is thus bent, interference between the support bars 1041 may be avoided. The support bars 1041 may be implemented with an injection molding material having a predetermined thickness for stiffness, and may include a metallic material such as SUS.

The multiple support bars 1041 may be directly attached to the rear surface of the display unit 15. However, this operation may take a long time and produce a lot of defects, resulting in poor productivity. In addition, directly processing the display unit 151 is highly likely to damage the display unit 151. Therefore, a rolling sheet 1045 to fix the multiple support bars 1041 may be further provided. The rolling sheet 1045 may include a metal material, and may employ a superelastic material that is bending-deformable and capable of recovering the flat state after the bending deformation. For example, a superelastic metal sheet such as a thin STS sheet of 0.05 mm or less may be used. An adhesive tape may be attached to both surfaces of the rolling sheet 1045 to bond the rolling sheet 1045 to the support bars 1041 and bond the rear surface of the display unit 151 to the rolling sheet 1045.

The rolling sheet 1045 may be provided with a kerf pattern in which multiple grooves extending in the third direction are formed in the first direction. The grooves in the kerf pattern may be formed between the multiple support bars 1041. The grooves may be formed on a surface of the rolling sheet 1045 to which the support bars 1041 are bonded. The kerf pattern may be formed in a wedge shape so as to be gradually narrowed from the surface portion of the rolling sheet 1045.

Instead of the rolling sheet 1045, an elastic material such as silicone may be disposed between the support bars 1041 to join neighboring support bars 1041. In this case, the angle between the support bars 1041 may be varied. The elastic connector may be bent at a position corresponding to the roller 210. When positioned on the front or rear of the mobile terminal, the elastic connector may be unfolded such that the support bars 1041 are disposed forming a flat surface.

The support bars 1041 may form a flat surface corresponding to the rear surface of the display unit 151. Alternatively, as shown in FIG. 8(*b*), the support bars 1041 may be formed in a shape having a predetermined curvature. The curved support bars 1041 may closely contact the curved surface of the roller 210 when the rolling plate 104 is rolled around the roller 210. Alternatively, one surface of the support bars 1041 in contact with the display unit 151 maintains a flat state, and the other surface thereof on the opposite side may include a curved surface corresponding to the curvature of the roller 210. In this case, the support bars 1041 may be thick at the ends thereof facing in the first and second directions and have the thinnest portion in the middle thereof.

The rolling plate 104 may be disposed at a position corresponding to the third region 151*c* and is rolled and bent around the roller 210. Thus, the rolling plate 104 may span over the front and rear surfaces. The rolling plate 104 is connected to the first front portion 1011 of the first frame 101 on the front side and connected to the slide frame 103 on the rear side. In order for the flexible display unit 151 to form a continuous surface without a step, the first front portion 1011 of the first frame 101 positioned on the rear surface of the first region 151*a*, the slide frame 103 positioned on the rear surface of the second region 151*b*, and the rolling plate 104 positioned on the rear surface of the third region 151*c* may be arranged such that the surfaces thereof in contact with the display unit 151 are at the same height. In particular, since the slide frame 103 moves on the rear of the mobile terminal 100 and moves in the same space as the rolling plate 104, the rolling plate 104 may have a thickness corresponding to the thickness of the slide frame 103.

FIG. 10 is a view illustrating an issue raised in an extendable mobile terminal 100. The figure shows the end of the second frame 102 facing in the third direction when the second frame 102 positioned overlapping the first frame 101 is extended as switching from the first state to the second state occurs. Since the display unit 151 contains a flexible material, the display unit 151 may be bent at a position corresponding to the roller 210. However, when the display unit 151 is positioned on the front of the mobile terminal 100 in the second state, it should be maintained in a flat state. Since the rolling plate 104 is not fixed to the second frame 102, the display unit 151 may sag downward as shown in FIG. 10(*a*) or rise upward as shown in FIG. 10(*b*).

The sagging issue of the display unit 151 (in FIG. 10(*a*)) may be addressed when the support bars 1041 of the rolling plate 104 described above support the rear surface of the third region 151*c* of the display unit 151 and the front portion of the second frame 102 supports the support bars 1041. However, in order to address an issue that the display unit 151 moved to the front is not arranged flat but is separated from the second frame 102 as shown in FIG. 10(*b*), the rolling plate 104 and the second frame 102 may further include a slide structure 1043, 1027. The slide structures 1043 and 1027 may fasten the rolling plate 104 (the display unit 151) so as not to be separated from the second frame 102 in the thickness direction of the mobile terminal 100 while allowing the movement thereof only in the first direction or the second direction.

Figure 11:
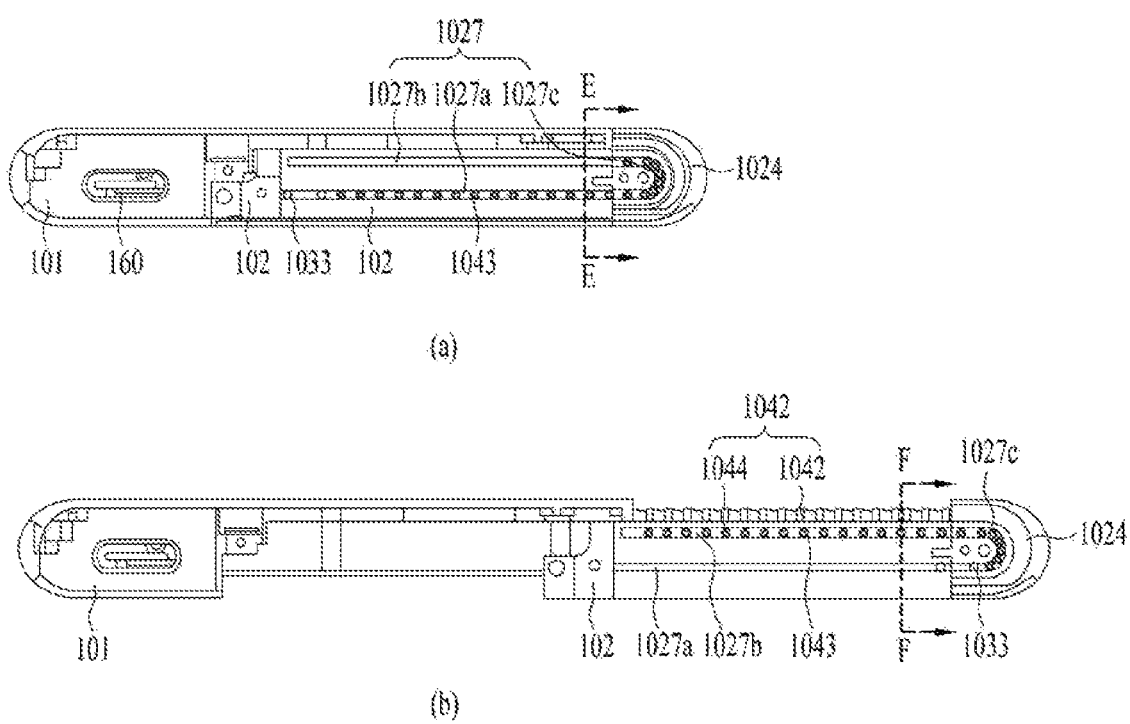
FIG. 11 is a cross-sectional view taken along lines C-C and D-D in FIG. 2.

FIGS. 11 to 13 are views showing the slide structures 1043 and 1027 provided on the rolling plate 104 and the second frame 102. FIG. 11 is a cross-sectional view taken along lines C-C and D-D in FIG. 2, FIG. 12 is a cross-sectional view taken along lines E-E and F-F in FIG. 11, and FIG. 13 is a view showing an expanded side portion 1042 and a guide hook 1043 of the mobile terminal 100 in accordance with an embodiment.

As shown in FIG. 13, the rolling plate 104 may include a slide hook 1043 protruding toward the second side portion 1023 positioned on the side of the second frame 102 facing in the third direction. As shown in FIG. 11, the second side portion 1023 of the second frame 102 may include a slide rail 1027 into which the slide hook 1043 is movably inserted. FIG. 11 shows the slide rail 1027 formed on the second side portion 1023 of the second frame 102. The slide rail 1027 may include a pair of horizontal portions 1027*a* and 1027*b* arranged side by side in a thickness direction and a curved portion 1027*c* connecting ends of the horizontal portions 1027*a* and 1027*b* facing in the first direction. The pair of horizontal portions 1027*a* and 1027*b* and the curved portion 1027*c* may form a U shape, and the slide hook 1043 may move along the slide rail 1027.

In the first state, the slide hook 1043 may be positioned in the horizontal portion 1027*a*, 1027*b* positioned on the rear side, as shown in FIG. 11(*a*). In the second state, the slide hook 1043 may be moved to the horizontal portion 1027*a*, 1027*b* positioned on the front side, as shown in FIG. 11(*b*). When moved from the rear horizontal portion 1027*a*, 1027*b* to the front horizontal portion 1027*a*, 1027*b*, the slide hook 1043 may pass through the curved portion 1027*c*. When the slide hooks 1043 pass through the curved portion 1027*c*, the rolling plate 104 may be bent and the space between the slide hooks 1043 may be narrowed.

The slide rail 1041 along which the slide hook 1043 moves may guide the movement of the slide hook 1043 and the movement of the slide frame 103 simultaneously. Since the slide frame 103 is also disposed adjacent to the support bars, a slide hook 1033 protruding from the slide frame 103 may be further provided.

FIG. 12(*a*) shows the second frame 102 in the first state in which the first frame 101 and the second frame 102 overlap each other, and FIG. 12(*b*) shows the second frame 102 moved from the first frame 101 in the first direction in the second state. As shown in FIG. 12(*a*), the support bars 1041 and the slide hooks 1043 are positioned on the rear in the first state. In the second state, as shown in FIG. 12(*b*), the support bars 1041 and the slide hooks 1043 are positioned on the front. The distance from the front face of the display unit 151 to the front horizontal portions 1027*a* and 1027*b* may be equal to the distance from the rear face of the display unit 151 to the rear horizontal portions 1027*a* and 1027*b*.

When large friction occurs during movement of the slide hooks 1043 along the slide rail 1027, a large load may be applied to the driving unit 200, thereby generating frictional noise or affecting the durability of the product. A self-lubricating member having high abrasion resistance and low friction resistance, such as polyoxymethylene (POM), may be used to facilitate the movement of the slide hooks 1043 on the slide rail 1027. By forming the slide hooks 1043 in a cylindrical shape, the area thereof in contact with the slide rail 1027 may be minimized.

As illustrated in FIG. 13, a slide roller 1044 fitted onto the slide hook 1043 may be further provided. The slide roller 1044 may be fitted onto the cylindrical slide hook 1043 to rotate about an axis extending in a direction in which the slide hook 1043 protrudes. The slide roller 1044 may rotate when the slide hook 1043 moves along the slide rail 1027, thereby reducing friction generated between the slide roller 1044 and the slide rail 1027.

A bearing structure may help to reduce the friction, but it may increase the overall size. For this reason, a simple ring-shaped slide roller 1044 may be used. A fastening groove 1043a and a fastening protrusion 1044a may be further provided to prevent the slide roller 1044 from being separated from the slide hook 1043. When the fastening protrusion 1044a is inserted into the fastening groove 1043a, the fastening groove 1043a formed on the outer circumferential surface of the slide hook 1043 in a ring shape and the ring-shaped fastening protrusion 1044a protruding from the inner surface of the slide roller 1044 are fastened to each other.

The second side portion 1023 of the second frame 102 is disposed overlapping the first side portion 1013 of the first frame 101 in the first state, and is exposed to the outside in the second state. Since the second side portion 1023 is positioned inside the first side portion 1013 of the first frame 101 in the first state, it may be difficult to connect the interface unit 160, the user input unit 123, the audio output unit 152, the antenna, and the like, which are positioned on the first side portion 1013, to the printed circuit board 181, which is positioned inside.

The second side portion 1023 may include an opening 1023a formed by omitting at least a part of the second side portion 1023 to connect the components positioned on the first side portion 1013 to the printed circuit board 181 positioned inside the first frame 101. Through the opening 1023a, a connector may be arranged between the components positioned on the first side portion 1013 and the printed circuit board. The opening 1023a may have a shape elongated in the first direction to prevent interference between the connector and the second side portion 1023 of the second frame 102 even when the second frame 102 is moved.

However, in order to prevent the inside of the mobile terminal 100 from being exposed through the opening 1023a in the second state, an expanded side portion 1042 may be formed at an end of the support bar 1041 to cover the opening 1023a in the second state. The expanded side portion 1042 may have a larger area than the cross section of the support bar 1041 at the end of the support bar 1041. The slide hook 1043 may be formed on a first expanded side portion 1042a extending in a direction away from the display unit 151. When the slide hook 1043 is disposed parallel to the support bar 1041, the second side portion 1023 of the second frame 102 should be extended adjacent to the display unit 151, which may make it difficult to form the opening 1023a. Accordingly, the slide hooks 1043 may be formed at positions spaced apart from the display unit 151 by a predetermined distance. The first expanded side portion 1042a may be formed in a fan shape to have a width that is reduced as the first expanded side portion 1042a extends in a direction away from the display unit 151. FIG. 13 is a view showing an embodiment of the rolling plate 104 of the mobile terminal 100. Since the rolling plates at positions on the curved portion 1027c of the slide rail 1027 spaced apart from the display portion 151 are disposed adjacent to each other, the first expanded side portion 1042a may be formed in a fan shape to prevent the rolling plates from overlapping each other.

The expanded side portion 1042 may also extend in the left-right direction, and may thus cover a space between neighboring support bars 1041. The expanded side portion 1042 may further include a second expanded side portion 1042b forming a step with respect to the first expanded side portion 1042a as shown in FIG. 13. The second extension side portion 1042b may be disposed to overlap the first expanded side portion 1042a adjacent thereto to cover the space between the support bars 1041. The second expanded side portion 1042b may have a size corresponding to the thickness-wise size of the opening 1023a formed in the second side portion 1023 of the second frame 102. The second expanded side portion 1042b may be formed to be shorter than the first expanded side portion 1042a on the side spaced apart from the display unit 151. The second expanded side portion 1042b may be formed to be shorter than the first expanded side portion 1042a to prevent the second expanded side portions 1042b from overlapping each other when the rolling plates pass through the curved portion 1027c of the slide rail 1027. The second expanded side portion 1042b may be formed to have a size corresponding to the size of the opening 1023a to cover the space between the first expanded side portions 1042a to prevent the inside of the second frame 102 from being exposed to the outside.

As shown in FIG. 14, the second expanded side portion 1042b may have any shape as long as the shape ensures that the second expanded side portions 1042b do not interfere with each other, and allows the second expanded side portion 1042b to cover the space between the first expanded side portions 1042a and to cover the opening 1023a of the second side portion 1023 of the frame 102. It may have a rectangular shape as shown in FIG. 14(a) or a semicircular shape as shown in FIG. 14(b).

Figure 15:
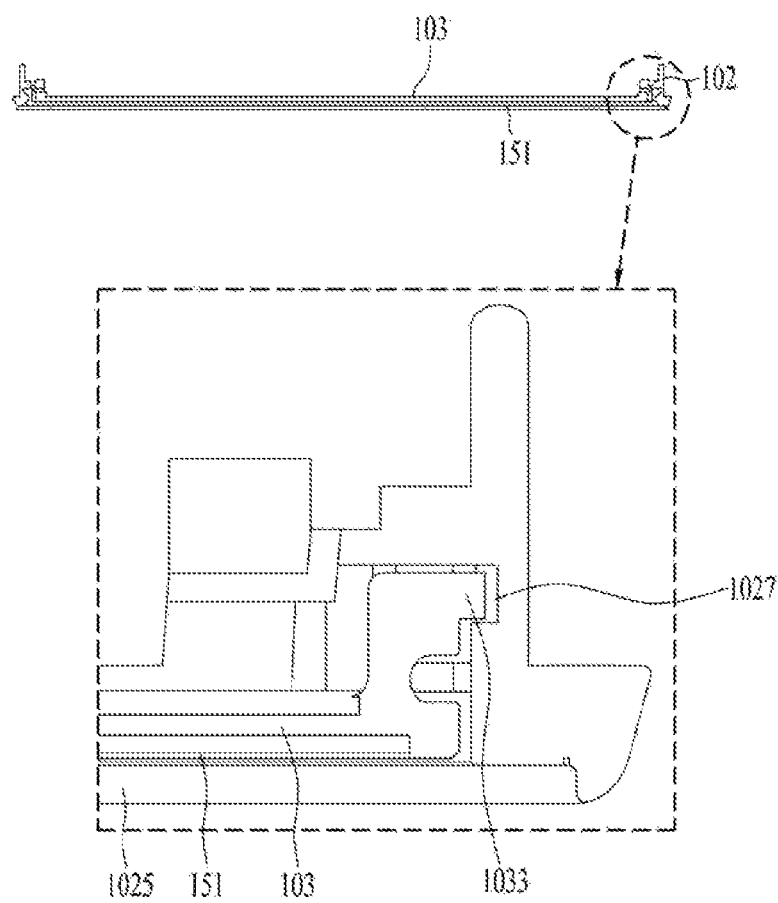
FIG. 15 is a view showing a slide frame and a second frame of the mobile terminal.

FIG. 15 is a view showing the slide frame 103 and the second frame 102 of the mobile terminal 100. Like the rolling plate 104, the slide frame 103 is positioned on the rear surface of the display unit 151 and moves together with the display unit 151. The rolling plate 104 moves to the back and front of the mobile terminal 100, but the slide frame 103 moves only on the back of the mobile terminal 100, that is, on the second rear portion 1022 of the second frame 102. A structure to guide the slide frame 103 to linearly move in the first direction or the second direction without distortion is needed. A guide slot extending in the first direction may be formed in the rear surface of the second frame 102 and the slide frame 103 may be configured to move along the guide slot.

However, since the second side portion 1023 of the second frame 102 includes the slide rail 1027 extending in the first direction as described above, the movement of the slide frame 103 may be guided through the slide rail 1027, into which the slide hook 1043 of the rolling plate 104 is inserted, without forming a separate guide rail. As shown in FIG. 15, slide hooks 1033 may be formed at both ends of the slide frame 103 to guide the slide frame 103 to move along the slide rail 1027. The slide hooks 1033 of the slide frame 103 may have a shape similar to that of the slide hook 1043 of the rolling plate 104. The slide hooks 1033 protrude from the display unit 151 in a direction away from the display unit 151. However, since the slide hooks 1033 of the slide frame 103 do not move to the front, they move only on a first horizontal portion.

Since the slide frame 103 and the rolling plate 104 move along the slide rail 1027, movement in the first direction and movement in the second direction may be guided stably, and the issue of separation of the display unit 151 from the second frame 102 may be addressed. However, since the slide rail 1027 is positioned at the end facing in the third direction, the middle portion of the slide frame 103 in the third direction may be separated from the second frame 102. To prevent the separation at the middle portion of the slide frame 103 while both ends of the slide frame 103 are fixed to the frame 102, a magnetic material may be used.

Figure 17:
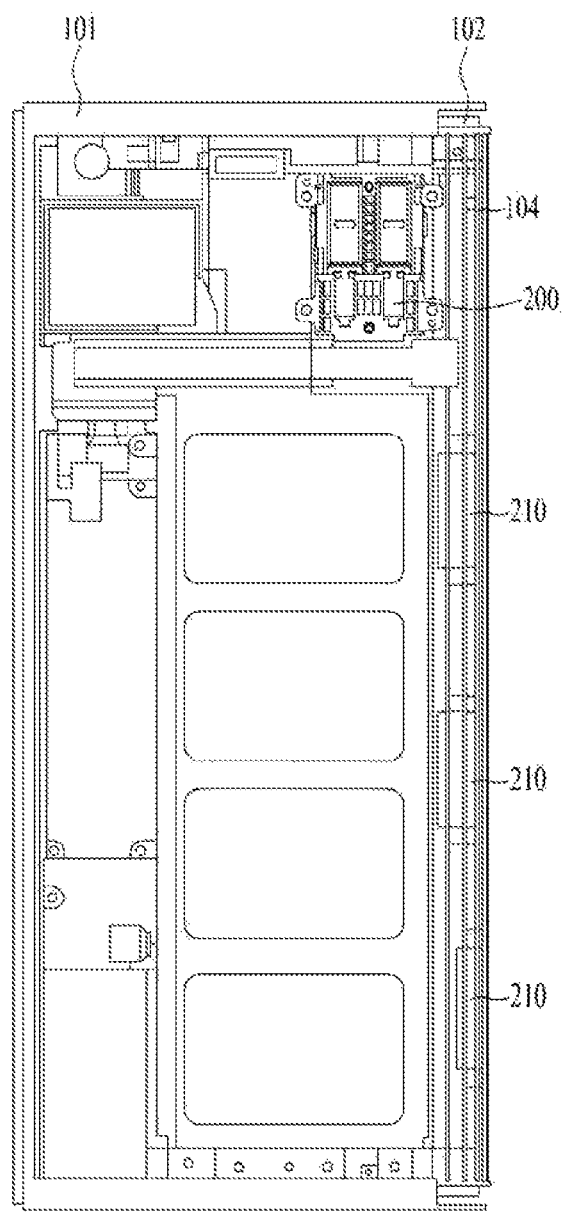

FIGS. 16 and 17 are diagrams illustrating a magnetic roller 211 coupled to the second frame 102 of the mobile terminal 100. The roller 210 is a member of a cylindrical shape rotating about an axis extending in the third direction. When the roller 210 is formed to have a great length corresponding to a length in the third direction of the mobile terminal, a rigidity of the roller 210 may be weakened and a large mounting space may be required.

In order to solve the above problems, as shown in FIG. 17, the roller 210 may include a plurality of rollers 210 with a small length. As shown in FIG. 17, in order to avoid interference with the driving unit 200 located at the top or to secure a mounting space of other parts, the rollers 210 may be omitted at some positions.

The roller 210 requires a shaft 212 to be rotatably coupled to the second frame 102. When the shaft 212 protrudes, the protruding shaft 212 may be broken. Thus, as shown in FIG. 16(b), a shaft hole 210h may be defined in a rotation axis direction in the roller 210 and the shaft 212 may be inserted into the shaft hole 210h. The shaft 212 may be made of a metal material for a rigidity.

The shaft 212 may be formed to be longer than the roller 210, and roller bearings 213 may be respectively fastened to both ends of the shaft 212 respectively protruding from both ends of the roller 210. The roller bearing 213 may minimize friction generated when the roller 210 is rotated through an inner ring, an outer ring, and a ball located between the inner ring and the outer ring. The inner ring is fixed to the shaft 212 and the outer ring is fixed to the second frame 102, so that the outer ring may not rotate when a state of the mobile terminal 100 changes, but only the inner ring may rotate. In order to fix the roller bearing 213 on a seating portion formed on the second frame 102, a fastener 216 of the bearing 213 may be further included.

FIG. 18 is a view showing another embodiment of the roller 210 of the present disclosure. The roller 210 provides, to the third region 151c of the display unit 151, a force to move from the rear surface to the front surface or vice versa while rotating. When the display unit 151 slides on the roller 210, a driving force of the roller 210 is not properly transmitted to the display unit 151, so that the movement of the display unit 151 may not be smoothly performed. In addition, when the display unit 151 is not in close contact with the roller 210, the display unit 151 may be lifted.

Therefore, a surface frictional force of the roller 210 may be increased such that the display unit 151 is able to be driven in close contact with the roller 210. A surface of the roller 210 may contain a high friction material. Thermoplastic poly urethane (TPU), a thermoplastic polyester elastomer (TPEE), or the like may be an example of the high friction material. Alternatively, laser processing and the like may be performed on a circumferential surface of the roller 210 to increase a surface roughness, thereby increasing the friction.

As shown in FIG. 18(a), the high friction material may be used for an entirety of the roller 210, but the high friction material has a problem of low strength or low hardness. In order to increase adhesion with the display unit 151 while securing the strength and the hardness of the roller 210, a high-strength plastic may be used for an inner portion of the roller 210 and a high-friction outer cover 2102 may be formed as an outer portion of the roller 210. An inner roller 2101 containing the high-strength and high-hardness plastic and the high-friction outer cover 2102 may be attached to each other in a dissimilar joining scheme or may be manufactured in a double injection scheme to rotate together.

When a cross-section of the support bar 1041 forms a straight line as shown in FIG. 18(a), there is an advantage that the display unit 151 may be remained in a flat state and drivability is good, but adhesion between the rolling plate 104 and the roller 210 is weak because a contact area between the plate 104 and the roller 210 is small as described above.

When the cross-section of the support bar 1041 is formed as a curved face to have a curvature corresponding to a curvature of the roller 210 as shown in FIG. 18(b), the frictional force between the roller 210 and the rolling plate 104 may be increased. However, because of the curved face of the support bar 1041, uneven irregularities may occur on the display unit 151.

In the embodiment of FIG. 18(a), when it is difficult to increase the contact area of the rolling plate 104, a surface roughness of the support bar 1041 of the rolling plate 104 may also be increased to increase the frictional force of the rolling plate 104. The frictional force may be increased by forming irregularities on a surface of the support bar 1041 in contact with the roller 210. The laser processing scheme may be exemplified as a processing scheme for forming the fine irregularities on the support bar 1041.

In order for the display unit 151 to move in close contact with the roller 210, a magnetic material may be used in addition to the method using the high friction material on the roller 210. The magnetic roller 211 containing the magnetic material provides a magnetic force to pull a metal material of the rolling plate 104, so that the rolling plate 104 may move in close contact with the roller 210.

A magnetic shielding sheet can be used as the rolling sheet 1045 so that the magnetic force of the roller 210 does not affect the outside of the mobile terminal 100 and only affects the support bars 1041.

FIG. 19 is a cross-sectional view showing a magnetic roller 211 and a rolling plate 104 in accordance with an embodiment. A magnet cannot consist of only one pole. The N-pole and the S-pole are arranged on one side and the opposite side of the magnet to face in different directions. In general, the poles of a cylindrical magnet are divided in the longitudinal direction of the cylindrical body of the magnet. On the other hand, the magnet roller 211 exhibits strong magnetic force at both ends thereof, while exhibiting weak magnetic force in the circumferential direction. Accordingly, the pulling force that the magnetic roller 211 exerts on the rolling plate 104 is weak.

Accordingly, in the present disclosure, the magnetic roller 211 having a cylindrical shape may be configured such that different poles are arranged along the outer circumference of the magnetic roller 211. As shown in FIG. 19, the magnet roller 211 may be divided into 2n sectors along the outer circumference thereof to dispose n S-poles and n N-poles. If the magnetic roller 211 consists of one N-pole and one S-pole, the rolling plate 104 may not be pulled uniformly during rotation. For this reason, n may be a number greater than 1.

FIGS. 20 and 21 are views illustrating magnetic force applied to the rolling plate 104 according to the number of poles of the magnetic roller. FIG. 20 is a view showing the arrangement of the rolling plate 104 and the magnetic roller 211 in the case where the magnetic roller 211 consists of one N-pole and one S-pole. A magnet having two poles exhibits large magnetic force at a position most distant from the other pole of another magnet, and weak magnetic force at a position adjacent to the other pole of the other magnet. When the poles of the magnet roller are arranged in the vertical direction as shown in FIG. 20(b), the two parts of the magnet exhibits strong magnetic force. However, when the poles of the magnet are arranged in the horizontal direction as shown in FIG. 20(a) or 20(c), only one part of the magnetic roller 211 that exhibits strong magnetic force contacts and overlaps the rolling plate 104, and accordingly the magnetic force of the magnetic roller 211 to pull the rolling plate 104 is weak.

Therefore, the magnet may be divided into more poles. When the magnet has six poles as shown in FIG. 19(a), the N-poles and the S-poles may be configured by combining three fan-shaped column magnets 211u each having an N-pole and an S-pole adjacent to each other.

FIG. 21 illustrates magnetic force applied by the magnetic roller 211 to the rolling plate 104 when a magnet having a shape as shown in FIG. 21(a) is used. In the case of FIGS. 21(a) to 21(c), at least three parts of the magnetic roller that exhibit strong magnetic force overlap the rolling plate 104. Accordingly, the rolling plate 104 may be pulled with sufficient magnetic force, and thus the display unit 151 may be maintained in the flat state.

FIG. 22 is a view showing a magnetic roller and a rolling plate in accordance with another embodiment. As shown in FIG. 22(a), the magnetic roller may be divided into four sectors along the outer circumference thereof to dispose two S-poles and two N-poles. This embodiment may be configured by attaching four fan-shaped sintered column magnets 211u each having opposite poles arranged on the inner and outer sides, as shown in FIG. 22(b).

The three fan-shaped column magnets 211u of FIG. 19 may have the same shape. For this magnet configuration, two types of magnets are needed. That is, a fan-shaped sintered column magnet 211a having the S-pole on the inner side and the N-pole on the outer side, and a fan-shaped sintered column magnet 211b having the N-pole on the inner side and the S-pole on the outer side are needed. Since these fan-shaped sintered column magnets 211a and 211b each have opposite poles arranged on the inner side (facing the shaft 211) and the outer side (facing the outer circumference), the magnetic field may be formed in a direction toward the shaft 212, that is, a radial direction of the magnetic roller 211, they may readily pull the rolling plate 104 flat.

FIG. 23 is a view showing another embodiment of the roller 210 of the mobile terminal. The inner portion in FIG. 18(b) is formed by the magnetic roller 211 described above and the high-friction outer cover 2102 is formed to further increase the friction between the roller 210 and the rolling plate 104.

Portions of the magnetic roller 211 located inside may have different poles in an axial direction as shown in FIG. 23(a) and may have different poles in a circumferential direction as shown in FIG. 23(b). As described above, when a S pole is located, an N pole is always located on the opposite side of the magnet, so that the magnetic roller 210 in which fan-shaped sintered magnets are arranged in the circumferential direction such that poles of outer portions of the sintered magnets are different from each other may be used as shown in FIG. 23(c).

The above-described roller 210 has a problem in that a mounting space of the roller 210 occupies a significant portion in the mobile terminal. As shown in FIG. 17, an area occupied by the roller 210 may be reduced in the axial direction of the roller 210 using the short rollers 210. In addition, as shown in FIG. 24, a size occupied by the roller 210 in a radial direction may be reduced using mini rollers 2103.

Figure 25:
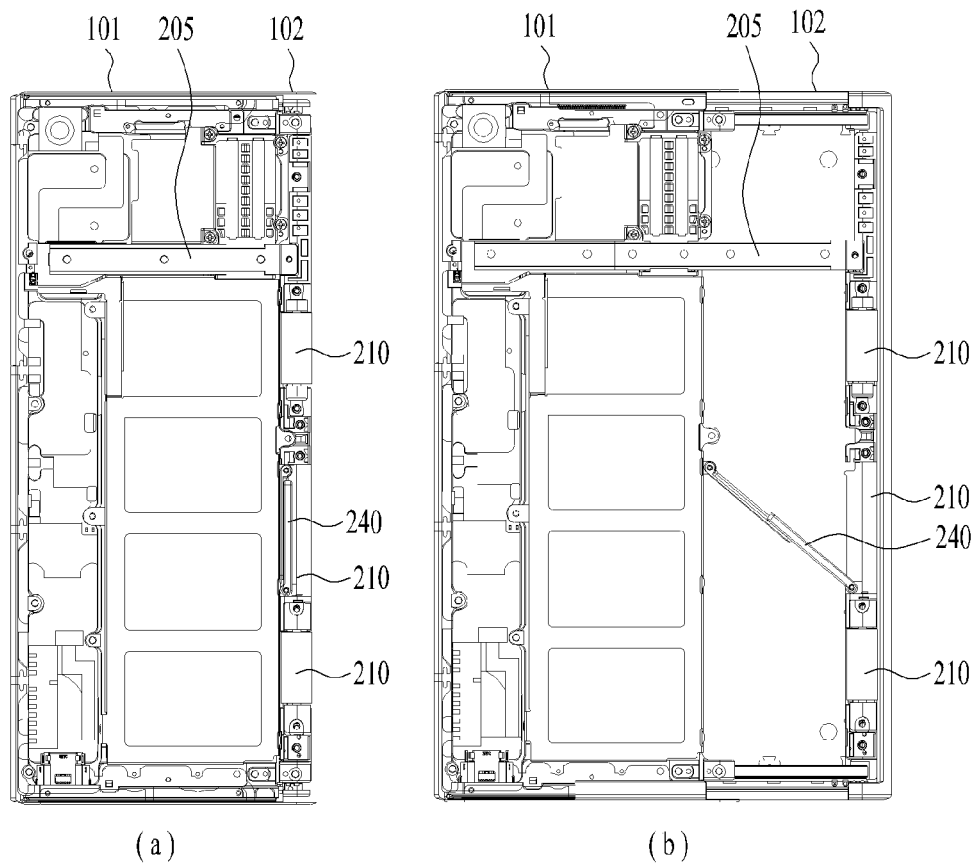
FIG. 25 is a view showing a first state and a second state of a mobile terminal in a state in which front surface components of the mobile terminal are removed.

FIG. 24 is a view showing another embodiment of the roller 210 of the mobile terminal. In addition, FIG. 25 is a view showing the first state and the second state of the mobile terminal 100 in a state in which front surface components of the mobile terminal are removed.

The roller 210 of the present embodiment includes the mini rollers 2103 having a small diameter. The above-described roller 210 used a roller 210 having a curvature corresponding to a bending curvature of the display unit 151. However, the roller 210 of the present embodiment may use the mini roller 2103 having a radius smaller than radii of curvature of the display unit 151 and the rolling plate 104.

As shown in FIG. 24(a), a curved face of the display unit 151 may be maintained using the plurality of mini rollers 2103. The plurality of mini rollers 2103 may be arranged at start and end points and a middle portion therebetween of the curved face of the display unit 151, so that the same effect as a roller 210 of a large diameter may be obtained.

In order to fix the plurality of mini rollers 2103 in positions, a roller fixing plate 2104 to which the plurality of mini rollers 2103 are fastened may be formed at each of both ends of the mini rollers 2103. The roller fixing plate 2104 may have a shape corresponding to the curvature of the rolling plate 104, as shown in FIG. 24(b). Because the roller fixing plate 2104 does not rotate, a material having a small frictional force may be used such that the rolling plate 104 may slide well.

Because the mini roller 2103 has a small surface in contact with the rolling plate 104, a high friction material or a magnet may be used to increase the adhesion between the rolling plate 104 and the mini roller 2103. Some of the plurality of mini rollers 2103 may be arranged as mini rollers 2103 of the high friction material and the others may be arranged as mini rollers 2103 of the magnetic material. Because the size of the magnet is small, the mini roller 2103 has an advantage in that it is easier for the mini roller 2103 to adjust the magnetic force and the friction than the magnetic roller 210 of the large size.

The mini roller 2103 may save a space represented in a dotted line as shown in FIG. 24(a) than the above-described roller 210 with the large diameter, so that the corresponding space may be further utilized. For example, as shown in FIG. 25, when the second frame 102 is extended by moving in the first direction, a support link receiving space for supporting the expanded portion may be provided.

One end of a support link 240 may be coupled to the first frame 101 and the other end thereof may be coupled to the second frame 102, and a length of the support link 240 may vary. In a first state, the length of the support link 240 is reduced and the support link 240 is disposed in parallel with the third direction as shown in FIG. 25(a). In addition, in a second state, the support link 240 is disposed diagonally as the length thereof increases as shown in FIG. 25(b). The support link 140 disposed obliquely in the second state may support the extended display unit 151 and the second front portion 1021 of the second frame 102.

In the first state, a storage space for the support link 240 is required. Some of the plurality of rollers 210 may be omitted to provide the space in which the support link 240 is disposed. Alternatively, when using the roller 210 composed of the mini rollers 2103 in FIG. 24, because the mini rollers 2103 are smaller in size, the support link 240 may be stored in the secured space.

The above-described various types of rollers 210 may constitute some of the plurality of rollers 210 arranged in the third direction. That is, some of the rollers 210 arranged in the third direction may use the rollers 210 of the high friction material and the others may use the magnetic rollers 210.

Alternatively, because the rollers 210 including the mini rollers 2103 in FIG. 24 may be partially used, the rollers 210 may be formed in various combinations. Through the combination of the rollers 210, the frictional force between the rolling plate 104 and the roller 210 may be adjusted to a desired level.

As described above, the mobile terminal of the present disclosure may adjust the size of the screen as needed, so that both the portability and the usability may be satisfied.

In addition, the display unit 151 may be prevented from being lifted when the second frame moves, so that the display unit 151 may be maintained in the flat state.

In addition, when the flexible display unit 151 expands or contracts, the flexible display unit 151 may stably move.

In addition, the space utilization may be increased using the mini roller and the adhesion between the roller and the rolling plate 104 may be easily adjusted.

The detailed description is to be considered in all aspects as illustrative and not restrictive. The scope of protection sought by the present disclosure should be determined by the appended claims and their equivalents, and all changes coming within the meaning and equivalency range of the appended claims are intended to be embraced therein.

What is claimed is:

1. A mobile terminal switchable from a first state to a second state by extending in a first direction, the mobile terminal comprising:
    a first frame;
    a second frame slidably-movable with respect to the first frame in the first direction or in a second direction opposite to the first direction;
    a slide frame slideably-movable with respect to the second frame in the first direction or in the second direction;
    a roller coupled to one side of the second frame and configured to rotate about an axis extending in a third direction perpendicular to the first direction, wherein the roller comprises an inner magnetic roller and a high friction outer cover;
    a flexible display including a first region coupled to the first frame, a second region coupled to the slide frame, and a third region positioned between the first region and the second region, wherein the third region is curved around the second frame; and
    a metal rolling plate comprising a surface attached to the flexible display.

2. The mobile terminal of claim 1, wherein the roller further comprises a rough surface.

3. The mobile terminal of claim 1, wherein the roller further comprises at least a thermoplastic polyurethane (TPU) or a thermoplastic polyester elastomer (TPEE).

4. The mobile terminal of claim 1, wherein the roller further comprises an inner high-strength plastic portion and a high-friction outer cover.

5. The mobile terminal of claim 1, wherein the inner magnetic roller comprises a series of circumferential magnetic portions alternately arranged such that N-poles of a first circumferential magnetic portion among the series of circumferential magnetic portions matches up with S-poles of a second circumferential magnetic portion among a series of circumferential magnetic portions and S-poles of the first circumferential magnetic portion matches up with N-poles of the second circumferential magnetic portion.

6. The mobile terminal of claim 5, wherein the first circumferential magnetic portion comprises a first plurality of lengthwise sections of the first circumferential magnetic portion having alternating S-poles and N-poles and the second circumferential magnetic portion is positioned at an outer circumference of the first circumferential magnetic portion and comprises a second plurality of lengthwise sections of the first circumferential magnetic portion having alternating S-poles and N-poles; and wherein the S-poles and N-poles of the first plurality of lengthwise sections are oppositely aligned with the S-poles and N-poles of the second plurality of lengthwise sections.

7. The mobile terminal of claim 1, wherein the roller further comprises:
    a roller shaft inserted into a shaft hole extending in the third direction; and
    a roller bearing fitted on the roller shaft and disposed on both sides of the roller shaft, wherein the second frame comprises a seating portion such that the roller bearing is disposed on the seating portion.

8. The mobile terminal of claim 1, wherein the roller further comprises mini rollers comprising a radius smaller than a radius of a curvature of a curved portion of the flexible display curved around the roller.

9. The mobile terminal of claim 8, wherein each respective mini roller further comprises a plurality of additional mini rollers respectively disposed at a starting point, an ending point, and an intermediate portion of the curved portion of the flexible display.

10. The mobile terminal of claim 9, wherein at least one of the plurality of mini rollers further comprises a high friction material and at least one of the others of the plurality of additional mini rollers comprises a magnet.

11. The mobile terminal of claim 8, further comprising a support link comprising a first end hingeably coupled to the first frame and a second end hingeably coupled to the second frame, wherein the support link comprises a variable length and is disposed to be adjacent to the roller in the first state.

12. The mobile terminal of claim 1, wherein the roller includes a plurality of rollers arranged in the third direction.

13. The mobile terminal of claim 1, wherein the rolling plate further comprises a plurality of support bars extending in the third direction and arranged side by side in the first direction, wherein the plurality of support bar further comprise a curved face having a curvature corresponding to a curvature of the roller.

14. The mobile terminal of claim 13, wherein the rolling plate further comprises a magnetic force shielding sheet comprising a first surface coupled to the support bars and a second surface coupled to the flexible display.

15. A mobile terminal switchable from a first state to a second state by extending in a first direction, the mobile terminal comprising:
    a first frame;
    a second frame slidably-movable with respect to the first frame in the first direction or in a second direction opposite to the first direction;
    a slide frame slideably-movable with respect to the second frame in the first direction or in the second direction;
    a roller coupled to one side of the second frame and configured to rotate about an axis extending in a third direction perpendicular to the first direction;

a flexible display including a first region coupled to the first frame, a second region coupled to the slide frame, and a third region positioned between the first region and the second region, wherein the third region is curved around the second frame; and a rolling plate comprising a surface attached to the flexible display, wherein the roller further comprises:

a roller shaft inserted into a shaft hole extending in the third direction; and a roller bearing fitted on the roller shaft and disposed on both sides of the roller shaft, wherein the second frame comprises a seating portion such that the roller bearing is disposed on the seating portion.

16. A mobile terminal switchable from a first state to a second state by extending in a first direction, the mobile terminal comprising:

a first frame;

a second frame slidably-movable with respect to the first frame in the first direction or in a second direction opposite to the first direction;

a slide frame slideably-movable with respect to the second frame in the first direction or in the second direction;

a magnetic roller coupled to one side of the second frame and configured to rotate about an axis extending in a third direction perpendicular to the first direction;

a flexible display including a first region coupled to the first frame, a second region coupled to the slide frame, and a third region positioned between the first region and the second region, wherein the third region is curved around the second frame; and a rolling plate comprising a surface attached to the flexible display, wherein the rolling plate comprises a plurality of support bars extending in the third direction and a magnetic force shielding sheet comprising a first surface coupled to the support bars and a second surface coupled to the flexible display.

* * * * *